(12) United States Patent
Kofman et al.

(10) Patent No.: US 8,167,212 B2
(45) Date of Patent: May 1, 2012

(54) RADIO FREQUENCY IDENTIFICATION SYSTEM AND DATA READING METHOD

(75) Inventors: Semion Kofman, Holon (IL); Yaron Meerfeld, Ramat Gan (IL); Maya Sandler, Bney-aish (IL); Shlomo Dukler, Tel Aviv (IL); Victor Alchanatis, Ra'anana (IL)

(73) Assignee: Inksure RF Inc., Fort Lauderdale, FL (US)

( * ) Notice: Subject to any disclaimer, the term of this patent is extended or adjusted under 35 U.S.C. 154(b) by 907 days.

(21) Appl. No.: 12/203,540

(22) Filed: Sep. 3, 2008

(65) Prior Publication Data

US 2009/0014520 A1 Jan. 15, 2009

Related U.S. Application Data

(63) Continuation of application No. PCT/IL2007/000022, filed on Jan. 9, 2007.

(60) Provisional application No. 60/780,307, filed on Mar. 9, 2006.

(51) Int. Cl.
*G06K 19/06* (2006.01)
(52) U.S. Cl. ........................ 235/492; 235/451
(58) Field of Classification Search .................. 235/492, 235/451; 340/572.7, 572.8
See application file for complete search history.

(56) References Cited

U.S. PATENT DOCUMENTS

| | | | |
|---|---|---|---|
| 5,694,102 A * | 12/1997 | Hecht | 235/456 |
| 5,862,255 A | 1/1999 | Davies et al. | |
| 6,529,154 B1 | 3/2003 | Schramm, Jr. et al. | |
| 6,836,449 B2 | 12/2004 | Raykhman et al. | |
| 6,997,388 B2 | 2/2006 | Yogev et al. | |
| 7,969,281 B2 * | 6/2011 | Kofman et al. | 340/10.1 |
| 2005/0280539 A1 * | 12/2005 | Pettus | 340/572.1 |
| 2008/0309969 A1 * | 12/2008 | Mazur | 358/1.15 |
| 2009/0072526 A1 * | 3/2009 | Peters et al. | 283/85 |

FOREIGN PATENT DOCUMENTS

EP 1065623 A2 1/2001

OTHER PUBLICATIONS

International Search Report, mailed Jun. 18, 2007, from International Application No. PCT/IL2007/000022, filed Jan. 9, 2007.
International Preliminary Report on Patentability, dated Sep. 9, 2008, from International Application No. PCT/IL2007/000022, filed Jan. 9, 2007.

(Continued)

*Primary Examiner* — Ahshik Kim
(74) *Attorney, Agent, or Firm* — Houston Eliseeva, LLP

(57) ABSTRACT

A system and method for reading an RFID data tag comprising a plurality of diffractive elements being indicative of machine-readable data carried by the tag are provided. The diffractive elements have such shape that the dimension of the diffractive elements along one axis is substantially different than the dimension of the elements along the perpendicular axis. Each diffractive element is oriented in a direction other than the direction of its neighboring elements. The system comprises a transmitting antenna configured for emitting an RF radiation signal at a predetermined polarization towards the tag; and a receiving antenna configured for collecting re-radiated RF radiation produced by the tag in response to the RF radiation signal at a polarization orthogonal to the polarization of the transmitting antenna and generating electromagnetic signals indicative of the data carried by the tag. The system also includes an interrogator unit configured for generating the transmitted RF radiation signal and processing the electromagnetic signals produced by the receiving antenna for determining the data carried by the tag.

28 Claims, 13 Drawing Sheets

OTHER PUBLICATIONS

Boag, A., "A Fast Multilevel Domain Decomposition Algorithm for Radar Imaging," IEEE Trans. Antennas and Propagation, vol. 49, No. 4, Apr. 2001, pp. 666-671.

Mensa, D. L., "High Resolution Radar Cross Section Imaging (2nd ed.)," Boston: Artech House, 1991, pp. 7-33, 139-200, 245-254.

News Release from Omron Electronics, "Laser sensors show their intelligence," Engineeringtalk magazine, Feb. 19, 2003, http://www.engineeringtalk.com/news/omr/omr168.html.

Serra, J., "Image Analysis and Mathematical Morphology," Academic Press, Inc., Orlando, FL, USA, 1983, pp. 43-50.

Soumekh, M., "Synthetic Aperture Radar Signal Processing," New York: John Wiley & Sons, 1999, Chapter 4, pp. 176-212.

Van Cappellen, W. A. et al., "Potentials of Ultra-Short-Pulse Time-Domain Scattering Measurements," IEEE Antennas and Propagation Magazine, vol. 42, No. 4, Aug. 2000, pp. 35-45.

* cited by examiner

RADIO FREQUENCY IDENTIFICATION SYSTEM AND DATA READING METHOD

RELATED APPLICATIONS

This application is a Continuation of PCT application serial number PCT/IL2007/000022, filed on Jan. 9, 2007, and claims the benefit under 35 USC 119(e) of U.S. Provisional Application No. 60/780,307, filed on Mar. 9, 2006, both of which are incorporated herein by reference in their entirety.

FIELD OF THE INVENTION

This invention relates to radio frequency identification (RFID) systems and encoding and decoding methods, and in particular, to a data tag or label used in an identification system.

BACKGROUND OF THE INVENTION

Radio Frequency Identification (RFID) is an automatic identification technology, relying on storing and remotely retrieving data, using devices called RFID tags or transponders. The RFID system consists of two major components—an interrogator/reader and a data carrier, such as a data tag or data label. These components work together to provide the end user with a non-contact solution to uniquely identify people, animals or objects. RFID data tags have recently become widely used for tracking objects, articles and products. Unlike optic barcode systems, RFID does not require line-of-sight and greatly reduces costs associated with the reading of each barcode tag.

An RFID tag is an object that can be attached to or incorporated into a product, animal, or person for the purpose of identification, using radio waves. Generally, RF tags can be active (utilizing an internal energy source incorporated with the tag, e.g., a battery) or passive, functioning by using the energy of an external interrogation signal and dependent on energy supplied from a tag reader or an external device.

An active RF tag typically includes an antenna attached to a resonance circuit, which is energized by the received interrogation signal and which, when energized, excites the antenna to transmit a response radio frequency signal. Passive tags do not include an energy source, but only respond to existing radiation by retransmitting, reflecting, or scattering, and typically do not include active elements.

A passive RFID tag that does not depend on a silicon microchip is usually referred to as a chipless tag. Some chipless tags use plastic or conductive polymers instead of silicon-based microchips. Other chipless tags use materials that reflect back a portion of the radio waves beamed at them. They might be implemented also by using etching or conductive ink printing technologies and can be printed directly on articles as etched or screen printed metal-based antennas.

RFID tags can be placed on or in an article that might be used in retail or for large manufacturing, warehousing and distribution facilities. For instance, in the pharmacological industry these tags can be used for identifying the manufacturer or company entity, the drug class, product's name, and also serial number. Likewise, the tags can carry information such as the drug's dates of manufacture and expiry, batch number, price and even destination data.

U.S. Pat. No. 6,997,388 assigned to the Applicant of the present invention describes a radio frequency (RF) data tag. The RF data tag comprises at least one diffraction element that has a dimension of the order of a wavelength of RF radiation and is responsive to RF irradiation, the response produced by the diffraction elements in the data tag being indicative of machine-readable data carried by the data carrier. U.S. Pat. No. 6,997,388 describes a diffraction pattern originated from the diffraction elements that define a symbol in a data that symbolize a data marking information code-language. The diffraction elements are made of materials having a specific RF diffraction absorption, reflection or scattering properties different from that of the substrate material. The reflective material can, for example, be a conductive ink, which is printed on a substrate, which, on RF radiation, causes the diffraction pattern.

European Patent Application No. 1 065 623 describes microwave readable barcodes and microwave barcoding systems. Microwave readable barcodes have conductive bars that selectively resonate with incoming microwave signals. Conductive bars can be made from conductive ink or from a conductive foil. Barcode information can be encoded using conductive bars of different lengths, different angles, or different positions. Microwave readable barcode systems include a barcode made from conductive bars, a transmitter that radiates a microwave signal onto the barcode, and a sensor that senses the effect of the conductive bars on the microwave signal. Sensors can sense the attenuation or the non-attenuation of the microwave signal by the conductive bars, and/or the scattering or the non-scattering of the microwave signal by those bars.

One of the techniques used for RFID tag identification is RADAR (radio direction and ranging) that is widely used for detection of objects (targets) navigation and ranging. As in RFID systems, radar also uses a transmitter to illuminate an object and a receiver to detect its existence or position (or both).

For example, U.S. Pat. No. 6,529,154 to Schramm. Jr. et al. describes a method and apparatus for sensing two-dimensional identification marks provided on a substrate or embedded within a substrate below a surface of the substrate. Micropower impulse radar is used to transmit a high rise time, short duration pulse to a focused radar target area of the substrate having two dimensional identification marks. The method includes listening for radar echoes returned from the identification marks during a short listening period window occurring a predetermined time after transmission of the radar pulse. If radar echoes are detected, an image processing step is carried out. If no radar echoes are detected, the method further includes sequentially transmitting further high rise time, short duration pulses, and listening for radar echoes from each of said further pulses after different elapsed times for each of the further pulses until radar echoes are detected. When radar echoes are detected, data based on the detected echoes is processed to produce an image of the identification marks.

U.S. Pat. Appl. Publication No. 2005/0280539 to Pettus describes a system and method for encoding and decoding information by use of radio frequency antennas. The system includes one or more interrogator devices and RFID data tags. The RFID data tags include a plurality of antenna elements, which are formed on a substrate or directly on an object. The antenna elements are oriented and have dimensions to provide polarization and phase information, whereby this information represents the encoded information on the RFID tag. The interrogator device scans an area and uses radar imaging technology to create an image of a scanned area. The device receives re-radiated RF signals from the antenna elements on the data tags, whereby the data tags are preferably represented on the image. The re-radiated RF signals preferably include polarization and phase information of each antenna element, whereby the information is utilized using radar signal imaging algorithms to decode the information on the RF data tag.

It should be noted that encoding tags with information by using phase and polarization can be impractical and expensive. The phase of the reflection by a given element is dependent on the distance from the transmitting antenna to that element and back to the receiving antenna. For example, at the operating frequency of 60 GHz (i.e., the wavelength of 5 mm), a slight bending of the tag, by say 0.625 mm, can produce a phase shift of 90 degrees, which makes the phase information totally useless. Thus, it appears that phase information is too sensitive to be relied on.

Moreover, polarimetric techniques described in US 2005/0280539 involve transmission and reception in both polarizations. Such methods can provide characterization of the illuminated tags, but are hard and expensive to implement. In particular, polarimetric measurements are sensitive and hard to calibrate. Likewise, reception of the co-polarized radiation makes the interrogator susceptible to desensitization due to strong reflections by neighboring objects.

A Synthetic Aperture Radar (SAR) technique is known, which performs sophisticated post-processing of radar data and is used to produce a narrow effective beam, thereby significantly increasing the system detection capability and resolution. Synthetic Aperture Radar (SAR) images can be obtained by processing radar scattering data collected over a range of angles and frequencies (see, for example, D. L. Mensa, *High Resolution Radar Cross Section Imaging* ($2^{nd}$ ed.), Boston: Artech House, 1991; M. Soumekh, *Synthetic Aperture Radar Signal Processing*; New York: John Wiley & Sons, 1999).

In SAR, data collection is performed with a radar moving across the line-of-sight, while the target is stationary. On the other hand, an Inverse SAR (ISAR) refers to the case when the target is moving (usually rotated), while the radar is stationary. Radars can operate either in a continuous wave (CW) mode or pulsed mode, and employ one or more transmitting and receiving antennas.

The motion of the transmitting and/or receiving antenna may be provided mechanically or simulated by the antennas' array electronic switching. The optimum geometric resolution that can be provided with SAR is determined by centre frequency and bandwidth of the transmitted signal and the aperture angle, over which the antenna, along the straight path, illuminates the target area.

Synthetic Aperture Radar images can be obtained by processing radar scattering data collected over a range of angles and frequencies. Under far-field conditions, SAR and ISAR signal processing is conventionally reduced to a multidimensional Fourier transform, which is performed by the Fast Fourier Transform (FFT) algorithm (see, for example, D. L. Mensa, *High Resolution Radar Cross Section Imaging* ($2^{nd}$ ed.), Boston: Artech House, 1991, Chapter 5, pp. 139-200; M. Soumekh, *Synthetic Aperture Radar Signal Processing*; New York: John Wiley & Sons, 1999, Chapter 4, pp. 176-212). Moreover, fast algorithms for near-field processing are also known (see, for example, A. Boag, "A Fast Multilevel Domain Decomposition Algorithm for Radar Imaging," *IEEE Trans. Antennas and Propagation*, vol. 49, no. 4, pp. 666-671, April 2001).

SUMMARY OF THE INVENTION

According to a first aspect of the present invention, a novel chipless radio frequency identification (RFID) data tag is provided that can be target interrogated by a radar-type reader system. The images of the tag are obtained by processing re-radiated RF radiation collected over a range of angles and frequencies. The terms 'tag' and 'label' as they appear in the present description both refer to a multi-bit data carrier, and therefore can be used herein interchangeably.

Thus, according to one embodiment of the present invention, the RFID data tag includes a plurality of diffractive symbol elements being indicative of machine-readable data carried by the tag. The diffractive symbol elements have such shape that the dimension of the diffractive symbol elements along one axis is substantially different than the dimension of the elements along the perpendicular axis. Moreover, each diffractive symbol element is oriented in a direction other than the direction of its neighboring elements. Preferably, but not mandatory, the directions of each two neighboring elements are perpendicular to each other.

According to an embodiment of the invention, the diffractive symbol elements can be made of a material scattering or reflecting RF radiation. For example, the diffractive symbol elements can be electrically conducting elements, which are formed on a package, substrate or directly on an article. Patterns of the symbol elements can be produced, for example, by using a variety of printing techniques employing a conductive paint or ink. When desired, the diffractive symbol elements can also be incorporated, into the structure of an article with which the tag is associated.

Alternatively, when the article is conductive, the tag can comprise a plurality of holes or elements which are made of material absorbing RF radiation. The tag (conducting or absorbing) elements are located and have dimensions to provide position and amplitude information, whereby this information represents the encoded information on the RFID tag.

According to one embodiment of the invention, the data information code of the tag is defined by presence or absence of the element.

According to another embodiment of the invention, the data information code of the tag is defined by dimensions of the symbol elements.

According to still another embodiment of the invention, the data information code of the tag is defined by a layout distance from a certain element to its neighbor.

According to a further embodiment of the invention, at least a part of the diffractive symbol elements introduce redundant information in the content of the tag. The redundant information can be useful for data error correction, and can be based on various error correction schemes, e.g., parity bits, checksum, etc.

According to yet another embodiment of the invention, the RFID data tag further comprises at least one diffractive reference element arranged for recognition of a border and orientation of the tag. Moreover, the RFID data tag can comprise a plurality of diffractive reference elements arranged between the symbol elements for distinguishing thereof.

The wave generated by a radar irradiating a target can have a well-defined polarization, e.g., vertical or horizontal polarization, though circular polarization can also be employed. The electromagnetic radiation (wave) re-radiated (back-scattered or reflected) from relatively large (when compared to the wavelength) natural and artificial objects may have the same (or almost the same) polarization as the incident wave. On the other hand, relatively thin, diagonally oriented objects and edges can produce both polarizations (cross-polarization) components of the re-radiated radiation.

This fact is used in the present invention to distinguish the scattering of the tag from the clutter (i.e., reflections from the surrounding objects). In particular, clutter reduction can be important under near-field conditions when very strong reflections, often referred to as glint, (for example from large metallic objects) might saturate and, consequently, desensitize the radar receiver. To this end, for clutter reduction the present invention employs the fact that the incident wave and the wave re-radiated from the tag of the invention has different polarizations.

Thus, in accordance with another aspect of the present invention, a method is provided for reading the RFID data tag comprising a plurality of diffractive elements being indicative of machine-readable data carried by the tag, where the diffractive symbol elements have such shape that the dimension of said diffractive symbol elements along one axis being substantially different than the dimension of the elements along the perpendicular axis, and each diffractive symbol element is oriented in a direction other than the direction of its neighboring elements. The method includes generating and transmitting an RF radiation signal at a predetermined polarization towards the RFID data tag. Then, the method includes collecting re-radiated RF radiation produced by the tag in response to the RF radiation signal. According to the present invention, the re-radiated RF radiation produced by the tag is collected at a polarization orthogonal to the polarization of the RF radiation signal transmitted towards the tag. Thereafter, the method includes processing the re-radiated RF radiation for obtaining position and amplitude information of each diffractive element by using radar signal imaging or inverse scattering algorithms. This information is utilized to decode the information on the RF data tag and to determine the data carried by the tag.

According to one embodiment of the invention, signal processing can be based on radar imaging algorithms that are based on a simplifying assumption of a single scattering that is also known as Born approximation. Under this assumption, the target, such as a tag, is assumed to comprise a multitude of isotropic point scatterers, which do not interact with each other, but only scatter back the incident wave coming from the radar.

According to another embodiment of the invention, various inverse scattering techniques can be used. These techniques are more accurate, but involve computationally intensive non-linear processing algorithms. Such techniques can also take into account interactions between various diffractive elements and various tags. Thus, considerably higher information densities are possible to decode if inverse scattering rather than conventional radar imaging algorithms are employed.

In particular, high resolution imaging can be employed based on principles similar to synthetic aperture radar (SAR) or inverse synthetic aperture radar (ISAR). The imaging can be two- or three-dimensional.

Spatial resolution is achieved by relative movement of the radiating and receiving antennas and the tag as well as by frequency scanning.

According to one embodiment of the invention, generating and transmitting an RF radiation signal and collecting RF radiation produced by the tag is carried out while moving an antenna of a reading system in a desired trajectory relative to the tag.

According to another embodiment of the invention, generating and transmitting an RF radiation signal and collecting re-radiated RF radiation produced by the tag is carried out while moving the tag in a desired trajectory relative to an antenna of a reading system.

In particular, in SAR configuration, the imaging is achieved by frequency scanning and antenna movement. The antenna movement can be achieved by mechanically moving the antenna or by electronic scanning by using a phased-array antenna. The movement can be linear, along an arc, or along an arbitrary trajectory, as long as the aspect angles of the antenna relative to the tag are changed.

Likewise, in the ISAR configuration, the imaging is achieved by frequency scanning and movement of the tag. The tag movement can be rotational, linear, or arbitrary, as long as the aspect angles of the antenna relative to the tag are changed.

When required, a combination of antenna and tag movement can be also employed to achieve spatial resolution along two cross-range directions.

The frequency scanning can be performed by a variety of waveforms, such as step frequency pulse signal, Linear Frequency Modulation (LFM) within a relatively long pulse, and/or by any other wideband signal covering the desired frequency band. Alternatively, frequency scanning can be replaced by using short pulse waveforms that provide range resolution directly.

According to one embodiment of the invention, the processing of the re-radiated RF radiation includes: computing an image of the tag by performing a SAR or ISAR algorithm; reconstructing and recognizing the pattern of the diffractive tag's elements; and decoding the data carried by the tag.

For example, when the transmitting of the RF radiation signal and collecting of the re-radiated RF radiation produced by the tag is carried out by scanning the tag in a predetermined frequency range $[f_{min}, f_{max}]$, in a predetermined range of azimuth angles $[\varphi_{min}, \varphi_{max}]$ at which the tag is observed by the interrogator unit in a horizontal plane, and in a predetermined range of vertical position values of displacements (or elevation angles) $[z_{min}, z_{max}]$ in a vertical plane, the ISAR algorithm can include performing a discrete version of the near-field ISAR transform $$g(r) = \int_{z_{min}}^{z_{max}} \int_{\varphi_{min}}^{\varphi_{max}} \int_{f_{min}}^{f_{max}} G(f, \varphi, z)$$
$$\exp[jk(|r - r_t(\varphi, z)| + |r - r_r(\varphi, z)| - 2R)] \, df \, d\varphi \, dz,$$

where $G(f,\varphi,z)$ is the calibrated measured data after background subtraction versus frequency f, azimuthal angle $\varphi$, and vertical position z; $k=2\pi f/c$ is the wave number with c being the speed of light; $r_t(\varphi,z)$ and $r_r(\varphi,z)$ are the phase centers of the transmitting and receiving antennas, respectively, versus azimuthal angle $\varphi$, and vertical position (elevation) z in the tag centered coordinate system; R is the distance from the phase centers of the antennas for $z=(z_{max}+z_{min})/2$ to the origin of the coordinate system located on the axis of rotation.

In order to evaluate Eq. (1), in the case of far-field conditions, Fast Fourier Transform (FFT) algorithms with various modifications can be employed. On the other hand, for high-resolution near-field imaging, a fast evaluation method can be utilized that is based on a hierarchical data domain decomposition and interpolation approach.

The image obtained by the ISAR (or SAR) algorithm is further processed for reconstructing the pattern of the tag's elements and recognizing the elements. According to an embodiment of the invention, the reconstructing and recognizing the pattern of the diffractive tag's elements includes:

eliminating a background and obstacles in the image of the tag and defining an area of the tag in which the symbol elements are provided;

spatially filtering the image data obtained after the eliminating a background and/or obstacles; and eliminating outliers and false detection symbols from the image; and thereby defining the symbols in the image.

For instance, the eliminating of the background can be carried out by comparing the intensity data indicative of the image of the tag to a predetermined lower threshold value applied to all pixels of the image, whereas the elimination of the obstacles can be carried out by comparing the intensity data indicative of the image of the tag to a predetermined upper threshold value applied to all pixels of the image.

According to an embodiment of the invention, the eliminating of outliers and false detection symbols includes: determining an orientation of a regression line; and sorting local intensity maxima peaks in the regression line according to their residuals.

Error correction procedures can be employed by introducing redundant information (such as parity bits, checksum, etc.) into the tag contents.

Thus, according to a further embodiment of the invention, the processing of the re-radiated RF radiation includes recognizing the tag's position, and accordingly correcting the tag's pattern, if the tag is turned or inverted.

According to yet another embodiment of the invention, the processing of the re-radiated RF radiation includes correcting the error in the data received after the computing of the image.

In accordance with a further aspect of the present invention, a system is provided for reading the RFID data tag comprising a plurality of diffractive elements being indicative of machine-readable data carried by the tag, where the diffractive symbol elements have such shape that the dimension of the diffractive symbol elements along one axis being substantially different than the dimension of the elements along the perpendicular axis, and each diffractive symbol element is oriented in a direction other than the direction of its neighboring elements.

The system includes:
a transmitting (Tx) antenna configured for emitting an RF radiation signal at a predetermined polarization towards the tag;
a receiving (Rx) antenna configured for collecting re-radiated RF radiation produced by the tag in response to said RF radiation signal at a polarization orthogonal to the polarization of the transmitting antenna and generating electromagnetic signals indicative of the data carried by the tag; and
an interrogator unit configured for generating said RF radiation signal and processing said electromagnetic signals produced by the receiving antenna for determining the data carried by the tag.

According to one embodiment of the invention, the system for reading the RFID data tag is a stationary device, whereas the tag is associated with a movable article.

According to another embodiment of the invention, the tag is associated with a stationary article, whereas the system for reading an RFID data tag is movable.

According to an embodiment of the invention, the interrogator unit includes:
(i) a transmitting part (Tx) including:
 a Tx antenna control module coupled to the transmitting antenna and configured for the electronic scanning control of the transmitting antenna;
 a power amplifier with variable gain coupled to the Tx antenna control module;
(ii) a receiving part (Rx) including:
 a Rx antenna control module coupled to the receiving antenna and configured for electronic scanning control of the receiving antenna synchronously with the transmitting antenna;
 a low noise amplifier with variable gain coupled to the Rx antenna control module;
 a quadrature detector coupled to the low noise amplifier with variable gain (408);
(iii) a variable frequency generator configured for generating a reference RF signal;
(iv) a modulator coupled to the variable frequency generator and configured for modulating said reference RF signal and producing a modulated signal;
(v) a first splitter coupled to the modulator and configured to split the signal from the modulator into two equal portions applied to the power amplifier with variable gain of the Tx part and to the quadrature detector of the Rx part,
(vi) a controller and signal processor (CSP) coupled to the variable frequency generator, the modulator, the power amplifier, the low noise amplifier, the Tx antenna control module, the Rx antenna control module, and configured for management of operation thereof and for processing output signals generated by the quadrature detector;
(vii) a position sensor unit configured for providing position of the tag,
(viii) an image processing unit configured for receiving signals generated by $CSP_5$ reconstructing an image of the tag and decoding data carried by the tag; and
(ix) a host computer interface coupled to the image processing unit, position sensor unit and the CSP.

The interrogator unit is configured to scan the diffraction pattern of the tag, receive the re-radiated RF radiation from the diffractive elements of the tags, and create an image of the scanned area by employing radar imaging or inverse scattering technology.

Information readout is performed by a combination of radar imaging and pattern/target recognition technique.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE PREFERRED EMBODIMENTS

Figure 1:
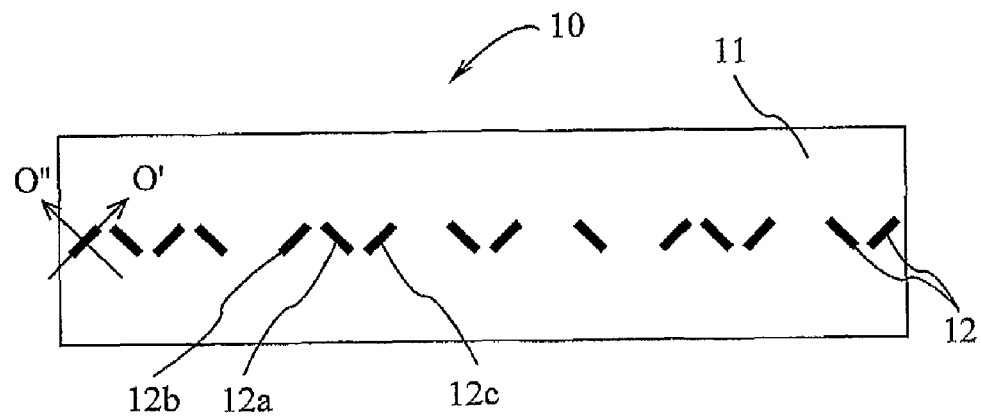
FIG. 1 is a schematic plan view of an RFED tag having an arrangement of the symbol elements according to one embodiment of the invention.

The principles and operation of the radio frequency identification system and data reading method according to the present invention may be better understood with reference to drawings and the accompanying description. It should be understood that these drawings which are not necessarily to scale, and examples in the description, are given for illustrative purpose only and are not intended to limit the scope of the invention. The same reference numerals will be utilized for identifying those components, which are common in the multi-bit data carriers shown in the drawings throughout the present description of the invention. Examples of constructions, materials, dimensions, and manufacturing processes are provided for selected elements. Those versed in the art should appreciate that many of the examples provided have suitable alternatives which may be utilized.

The present invention describes a novel chipless RFID data tag that can be target interrogated and read by a radar-type identification system based on Synthetic Aperture Radar (SAR) technique. The SAR images of the tag are obtained by processing radar scattering data collected over a broad range of angles and frequencies.

Referring now to the drawing, FIG. 1 schematically illustrates an RFID data tag 10 according to one embodiment of the invention. The RFID tag 10 comprises a substrate layer 11 whose surface is patterned to have a plurality of diffractive symbol elements 12. According to the present invention, the diffractive symbol elements 12 of the tag 10 have such shape that the elements' dimension along on an axis O' is substantially different (e.g., larger) than the elements' dimension along a perpendicular axis O''. For example, the elements 12 can be in the form of narrow strips. According to the invention, the symbol elements 12 are oriented with respect to each other in the manner that will be described hereinbelow.

The substrate layer 11 can, for example, be made of paper, cardboard, fabric, polymeric foils or solid materials. The diffractive symbol elements 12 can be printed on the RFID tag 10, for example, by using conductive ink and/or by using any other conductive material.

It should be noted that the relative dimension and position of the diffractive symbol elements 12 are shown in FIG. 1 and further drawings only as a non-limiting example, and are not drawn to scale. The element 12 has a dimension of the order of a wavelength of RF electromagnetic radiation (above 0.1 mm, considering that the RF frequency range is $10^4$ Hz-$10^{12}$ Hz) and is indicative of machine-readable data carried by the tag. According to the invention, radio frequency (RF) electromagnetic radiation is utilized for irradiating the diffractive symbol elements 12. For example, the RF continuous wave of one or more selected frequency bands can be used for irradiating the data tag of the present invention. According to another example, a train of relatively short pulses of RF radiation can be used for irradiating the data tag 10.

According to one embodiment, the elements 12 of the RFID data tag 10 are conductive elements. According to another embodiment, when the substrate layer 11 is conductive and/or the tag 10 is placed on a conductive object, the tag can comprise a plurality of holes or absorbing elements. In both cases, the relative position of the elements 12 with respect to each other and amplitude of the response on the interrogation signal can be indicative of the information encoded on the tag 10.

Figure 2:
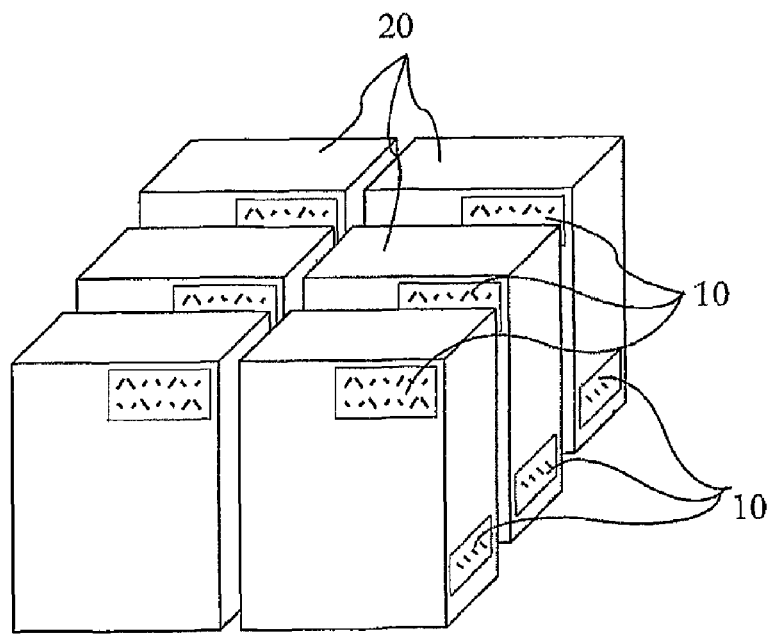
FIG. 2 illustrates an example of how the RFID tags of the present invention can be arranged on or in articles.

FIG. 2 illustrates an example of how RFID data tags (labels) 10 can be arranged on or in articles 20, such as packs, boxes, containers, etc. For example, the tags 10 can include conductive ink elements directly printed on a surface of the articles 20. In this case the articles themselves play a role of the substrates 11. Alternatively, the tag's substrates patterned with diffractive elements can be in the form of labels that can be attached to the articles 20. When desired, the diffractive symbol elements 12 can be incorporated into the structure of an article with which the tag is associated.

Figure 3:
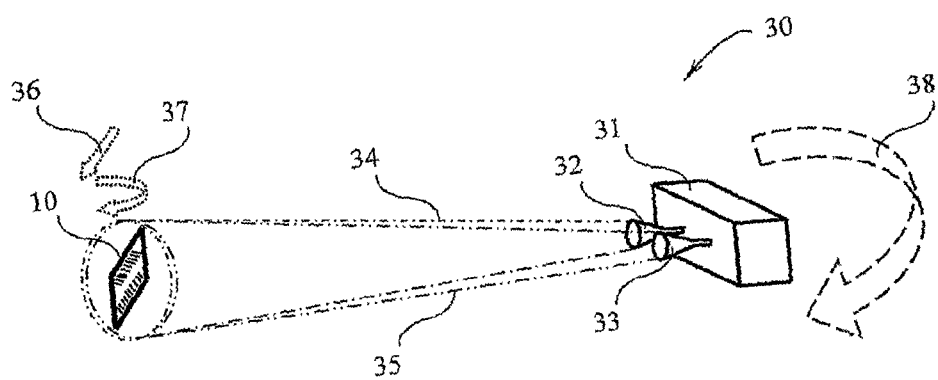
FIG. 3 illustrates a general schematic view of reading a tag by a tag identification system.

Referring to FIG. 3, a schematic view of reading the RFID data tag 10 by a tag identification system 30 is illustrated. The identification system 30 is based on a coherent radar system operating at millimeter-wave frequencies. For example, the identification system 30 can operate in the frequency range of 10 GHz to 1000 GHz, and preferably in the range of 59 to 64 GHz or 116 to 126 GHz, in order to comply with the Federal Communication Committee (FCC) regulations.

The identification system 30 generally comprises an interrogator (transponder) 31, a transmitting antenna 32 and a receiving antenna 33. In operation, the transmitting antenna] 32 emits an RF radiation signal 34 for irradiating the tag 10. The receiving antenna 33 collects an RF signal 35 produced (absorbed, scattered or reflected) by the tag 10.

The transmitting antenna 32 and the receiving antenna 33 have small radiating apertures to provide and intercept wide beams, covering all area of the tag 10. The antennas can be implemented as planar or non-planar structures. Examples of the transmitting antenna 32 and the receiving antenna 33 suitable for the purpose of the present invention include, but are not limited to, horn antennas, slot antennas, strip antennas, patch antennas, parabolic antennas, etc.

When desired, the antenna structure might be a lattice or phased array that realizes partially or completely electronic scanning of the tag without the necessity to move the interrogator 31 mechanically.

Figure 4A:
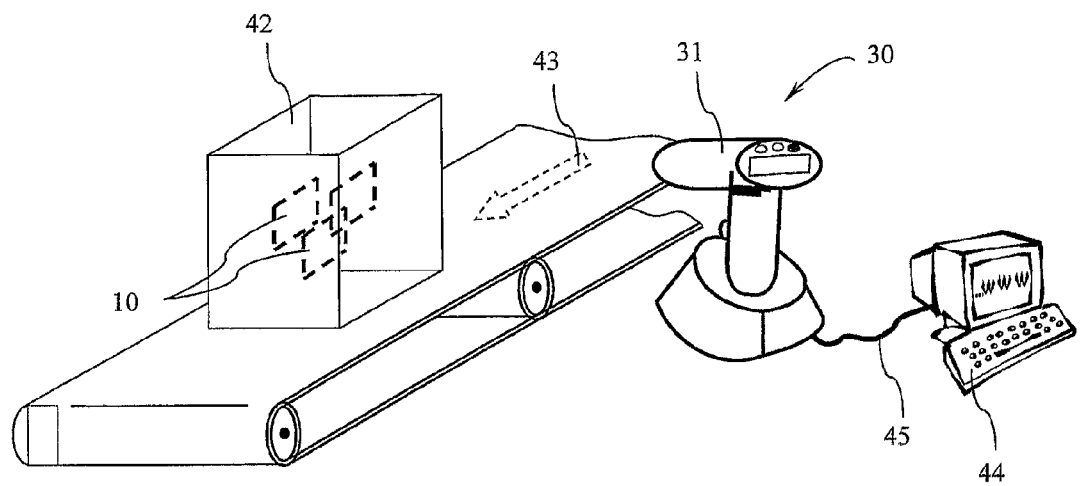
FIG. 4A shows an example of reading a tag by a stationary identification system.

According to one embodiment of the invention, the interrogator 31 is a stationary device, while the tag 10 is moved, either along a linear route 36 or along a curved route 37. FIG. 4A shows an example of the identification system 30 including the interrogator 31 in a stationary implementation, such as a desktop interrogator. A container 42 (that contains various articles (not shown) inside, e.g., packs, boxes, baggage, etc. all having labels 10) is placed on a moving conveyer 43. In operation, the desktop interrogator 41 generates an RF signal for irradiating the tag, reads image of the tag 10 indicative data encoded therein, processes the image, and sends the data to a host computer 44 via a wire or wireless link 45. The host computer 44 collects the data, and processes them for identification of the articles.

Figure 4B:
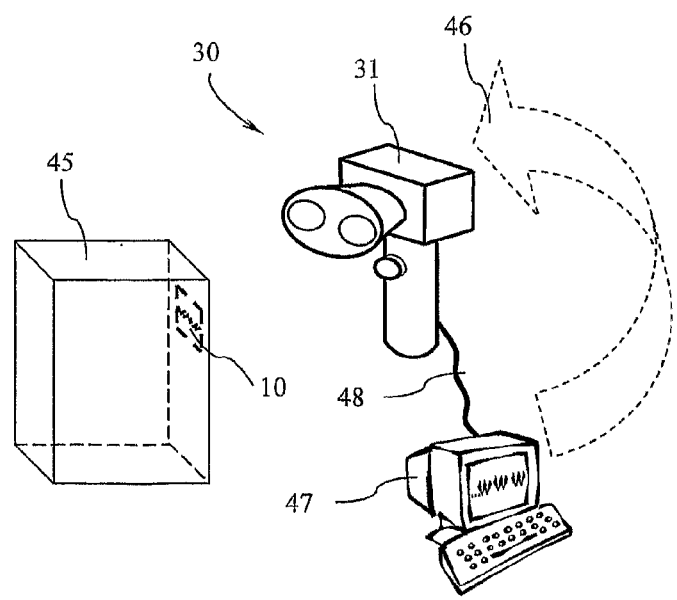
FIG. 4B shows an example of reading a tag by a mobile identification system.

Referring to FIG. 3 and FIG. 4B together, according to another embodiment of the invention, the tag 10 is stationary, while the interrogator 31 is moved around the tag 10 along a path 38. FIG. 4B shows the identification system 30 in a mobile (handheld) implementation, in which the article 45 has the tag 10 attached to or incorporated in the article 45. In operation, the interrogator 31 scans the tag by moving around along a path 46. The tag's data are collected and analyzed by a host computer 47, via a wire or wireless link 48 for identification of the article 45.

As described above, the diffractive symbol elements (12 in FIG. 1) of the tag 10 have such shape that the elements' dimension in one direction (i.e. along one axis) is substantially different than the elements' dimension in the perpendicular direction (i.e., along a perpendicular axis). Such a provision provides the possibility to reduce background clutter. For this purpose, the transmitting antenna 32 and the receiving antenna 33 have orthogonal polarizations.

Thus, in one embodiment, the transmitting antenna 32 produces a horizontally polarized field, while the receiving antenna 33 receives a vertically polarized field. It should be understood that the direction of polarization of the transmitting and receiving antennas can be interchanged and, in general, any two orthogonal polarizations can be employed for transmission and reception. According to the invention, the tag elements 12 are designed to produce strong cross-polarized response, while the clutter is mainly co-polarized. Specifically, the elements 12 are designed to produce a strong vertically polarized field, when illuminated by a horizontally polarized field emitted from the transmitting antenna and vice versa.

The electromagnetic wave emitted by the transmitting antenna 32 and scattered by different obstacles, walls, etc. is received by the receiving antenna 33 at the same polarization as it was originated. Since the receiving and transmitting antennas are cross-polarized, the electromagnetic field of the obstacles and walls will be significantly attenuated that prevent a "blinding", i.e., an overload of the receiver. On the other hand, according to the invention, the symbol data elements 12 are slanted and take intermediate direction between direction of polarizations of the transmitting and receiving antennas. Therefore, the elements 12 can scatter the electromagnetic field and produce both orthogonal polarization components, which can be accepted by the receiving antenna 33.

It should be noted that radar imaging algorithms may produce undesired artifacts on the resulting images, when a strong coupling exists between the neighboring tag elements. Such artifacts may make the information decoding difficult, and thus limit the information capacity of the tag. The coupling between the elements is maximal when the neighboring elements are parallel to each other.

According to one embodiment the invention, in order to reduce coupling between neighboring elements in the tag, all the elements in this embodiment of the invention are arranged in a line and the elements are oriented at right angles between each two neighboring elements, as shown in FIG. 1. Thus, the orientations of each two neighboring elements are orthogonal to each other. Such arrangement of the elements reduces coupling between the neighboring symbols, because when the neighboring elements are orthogonal to each other, electric current flowing along a certain element 12a does not induce a current in the neighboring elements 12b and 12c.

Figure 5:
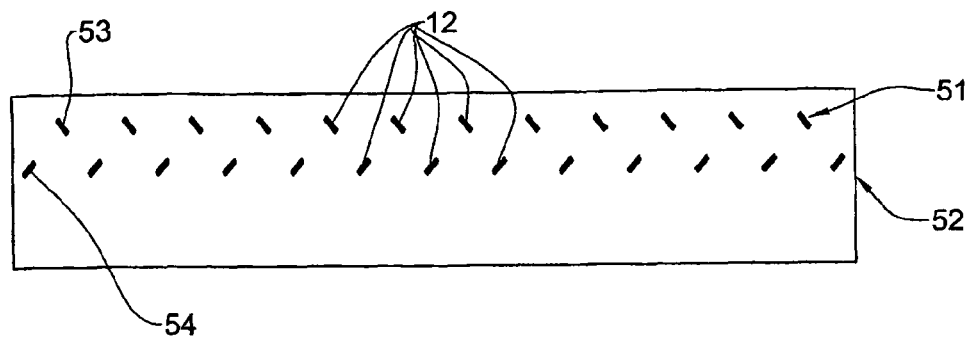
FIG. 5 is a schematic plan view of an RFID tag having an arrangement of the symbol elements according to another embodiment the invention.

Referring to FIG. 5, there is shown an arrangement of the symbol elements 12 according to another embodiment the invention. According to this embodiment, the elements 12 are arranged in two rows 51 and 52 being in parallel relation. Elements located in the row 51 are interleaved the with elements of the row 52 so that two neighboring elements 53 and 54 located in the different rows 51 and 52, correspondingly, are oriented to each other in the counter directions. This arrangement allows a further reduction of coupling between neighboring elements of the tag.

Figure 6:
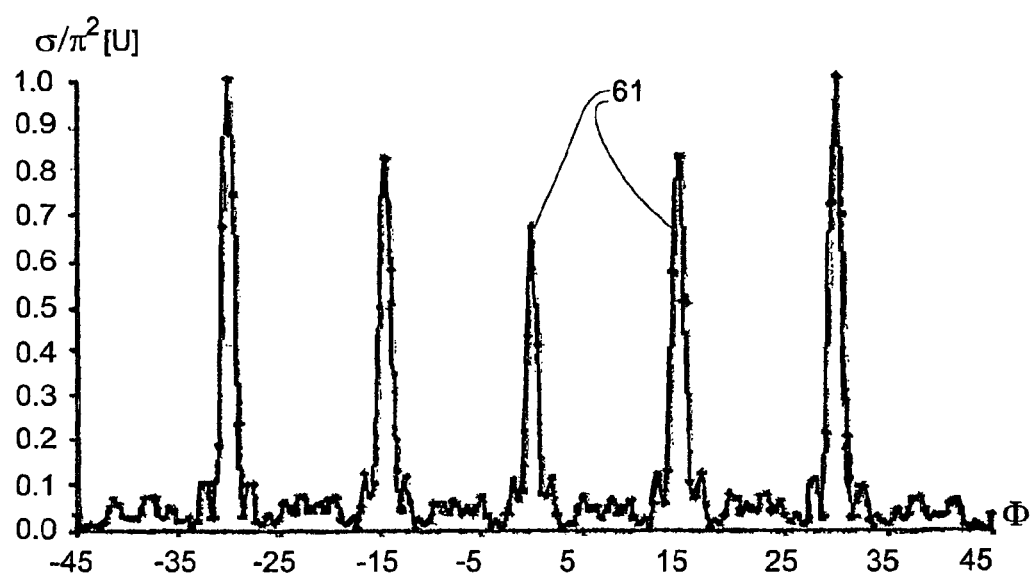
FIG. 6 is a representation of an exemplary diffraction pattern of a scattered electromagnetic field produced by the diffraction of the elements of a tag of the invention.

FIG. 6 is a representation of an exemplary diffraction pattern of a scattered electromagnetic field, which is produced by the diffraction of the tag's elements (12 in FIG. 1). Peaks 61 indicate maxima of the electromagnetic field diffraction pattern measured by the system (30 in FIG. 3). The diffraction pattern includes all information carried by the tag.

Referring to FIGS. 7-12, there are shown various examples of how information can be encoded on the data tag 10 by the symbol elements 12.

Figure 7:
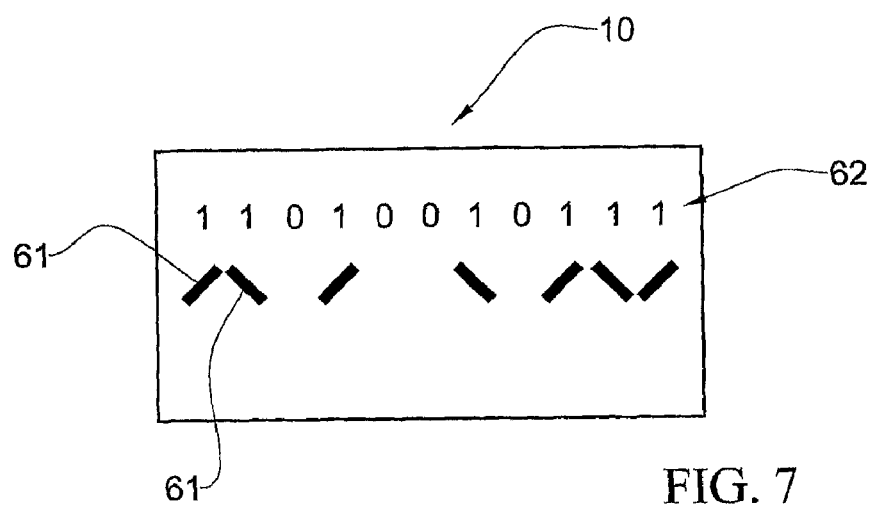
FIGS. 7-12 show various examples of how information can be encoded on a data tag by symbol elements.

According to the example shown in FIG. 7, the tag comprises symbol elements 61 arranged in a row in a predefined order characterized by the presence or absence of the elements. All the elements 61 have the same shape and dimensions, whereas each element is oriented in a direction other than the direction of its neighboring elements.

The absence of the element in the row can represent a "0" (zero), while the presence of the element can represent a "1" (one), or vice versa. Such a scheme is referred to as a binary encoding scheme. For example, a binary number 62 which is encoded in the tag shown in FIG. 7 is 11010010111.

It should be understood that owing to the fact that scattering of electromagnetic field by the elements depends on the physical parameters of the elements, the language of encoding can also be based on dimensions of the symbol elements, because elements with different dimensions have different amplitudes of response. Likewise, the distances between the symbol elements can also be used for encoding additional information.

Figure 8:
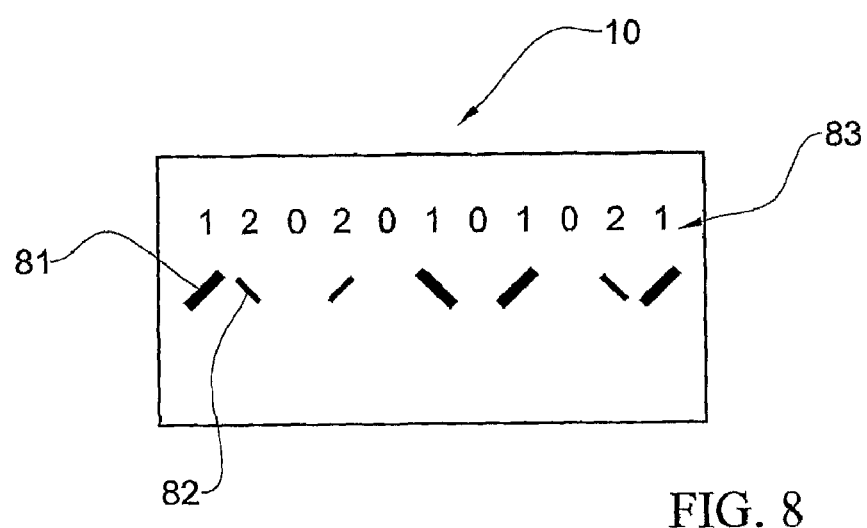

FIG. 8 shows another scheme of encoding the data tag 10 by symbol elements. According to this example, two types of symbols elements that have different sizes (width and length) are used. The symbols elements are arranged in a row in a predefined order characterized by the dimension, presence or absence of the elements. The alphabet of the coding can, for example, be as follows. The absence of any element in the row can represent a "0" (zero), the presence of a big element 81 can represent a "1" (one), while the presence of a small element 82 can represent a "2" (two). Such logic increases a capacity of the tag and gives a possibility to use a code having a radix higher that that of the binary code. Specifically, the radix of the code shown in FIG. 8 is 3. For example, a number 83 which is encoded in the tag shown in FIG. 8 by using the described logic is 12020101021.

Figure 9:
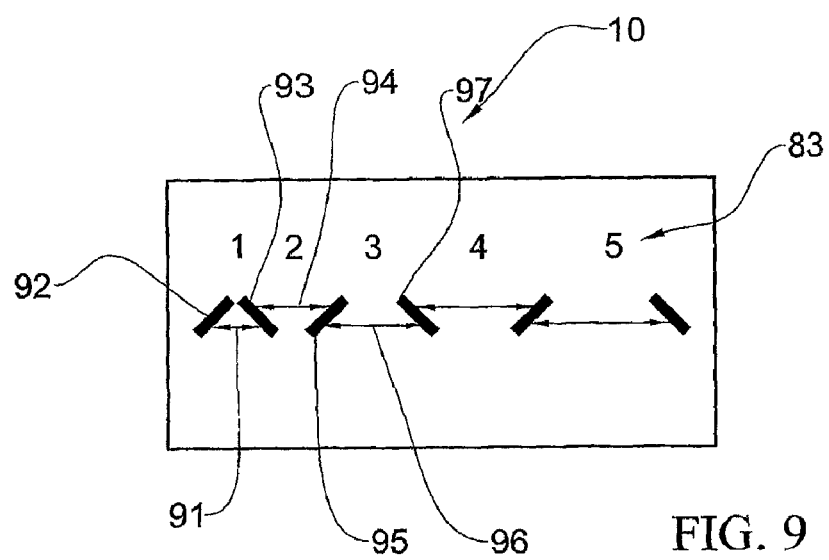

FIG. 9 shows a further scheme of encoding the data tag 10 by symbol elements. According to this example, a layout distance (a length of the interval) between each pair of neighboring symbol elements can vary to define a data information code ("language"). Specifically, a certain distance 91 from an element 92 to an element 93 can represent a "1" (one). A distance 94 from an element 93 to an element 95 that is larger than the distance 91, can represent a "2" (two). In the same manner, a distance 96 from an element 95 to an element 97 that is larger than the distance 94, can represent a "3" (three), etc. Thus, the example shown in FIG. 9 corresponds to a code having a radix of 5. For example, a number 83 which is encoded in the tag shown in FIG. 9 by using the described logic is 12345.

Figure 10:
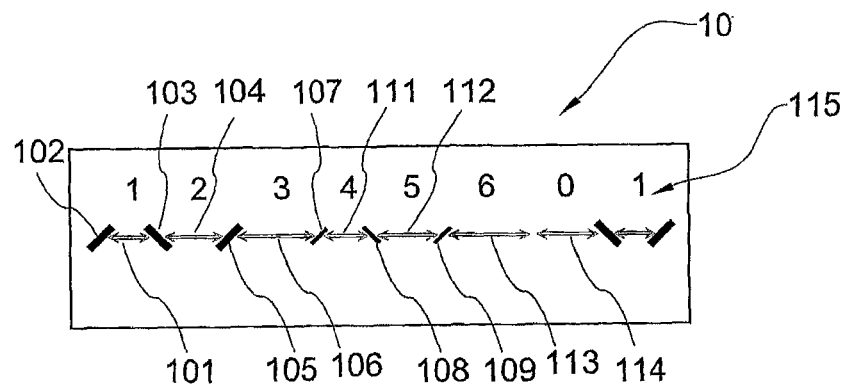
Figure 11:
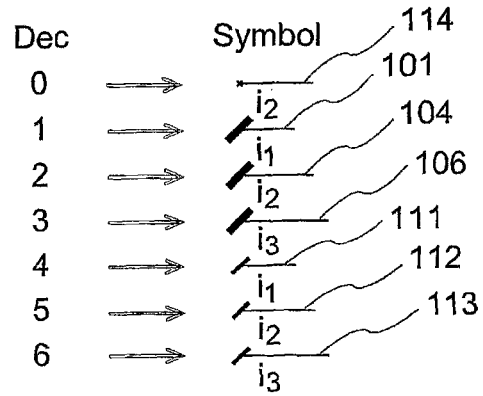

The data tags might be coded as a combination of the element sizes and variation of the layout intervals between the elements. Referring to FIGS. 10 and 11 together, a still further scheme of encoding the data tag 10 by symbol elements is illustrated. FIG. 10 shows a tag including symbols elements having two different sizes. The symbols elements are arranged in a row in a predefined order characterized by the distance between the elements, as well as presence or absence of the elements. FIG. 11 shows an exemplary alphabet of the coding employing this scheme. Specifically, a certain distance 101 from a big element 102 to a neighboring element on the right side can represent a "1" (one). A distance 104 from a big element 103 to a next element that is larger than the distance 101, can represent a "2" (two). In the same manner, a distance 106 from an element 105 to a neighboring element (in FIG. 10 this is a small element 107) on the right side can represent a "3" (three). The distance 106 has a value that is larger than values of the distances 101 and 104. Further, in order to represent a "4" (four), "5" (five), and "6" (six), the same logic is applied to small size elements 107, 108, 109 and corresponding distances (intervals) 111, 112, 113 from the elements 107, 108, 109 to the corresponding elements on their right sides. Likewise, the absence of an element along a certain distance 114 can represent a "0" (zero). Thus, the example shown in FIG. 10 corresponds to a code having a radix of 7. For example, a number 115 which is encoded in the tag shown in FIG. 10 by using the described logic is 12345601.

Figure 12:
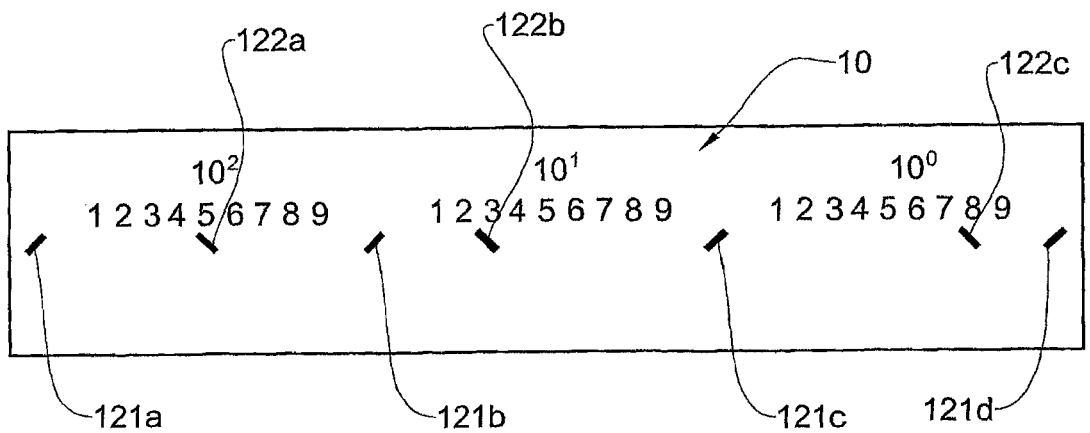

FIG. 12 shows a further scheme of encoding the data tag 10 by symbol elements. In accordance with this scheme, the tag includes a set of reference elements 121a, 121b, 121c and 121d arranged in a row at equal distances between the neighbors. Preferably, but not mandatory, all the reference elements have the same orientation. Symbol elements 122a 122b and 122c are arranged between the reference elements 121a, 121b, 121c and 121d, and are oriented to the reference elements in the counter directions. For example, the symbol elements 122a 122b and 122c are can be orthogonal to the reference elements 121a, 121b, 121c and 121d.

Specifically, the symbol element 122c is arranged between the reference elements 121c and 121d. The distance from the reference elements 121c to the symbol element 122c can represent a value of units of a certain number carried by the data tag. Accordingly, the distance from the reference elements 121b to the symbol element 122b can represent a value of tens of the encoded number. Likewise, the distance from the reference elements 121a to the symbol element 122a can represent a value of hundreds of this number. For example, the number which is encoded in the tag shown in FIG. 12 is 538. It should be understood that when desired, the number of reference elements and symbol elements can be increased, in order to represent thousands, etc.

In addition to the data representing information about a product, a tag can include various types of diffractive reference elements (marks) intended for better distinguishing the symbol elements, recognition of the tag's border and orientation as well as for more reliable identification of the tag. Moreover, a tag can include additional symbol elements introducing redundant information (e.g., parity bits, checksum, etc.) in the tag's content that can be used for data error correction. The error correction can, for example, be used in order to avoid detection failures when the tag is damaged. Error correction algorithms are known in the art, and therefore will not be described herein below.

Figure 13:
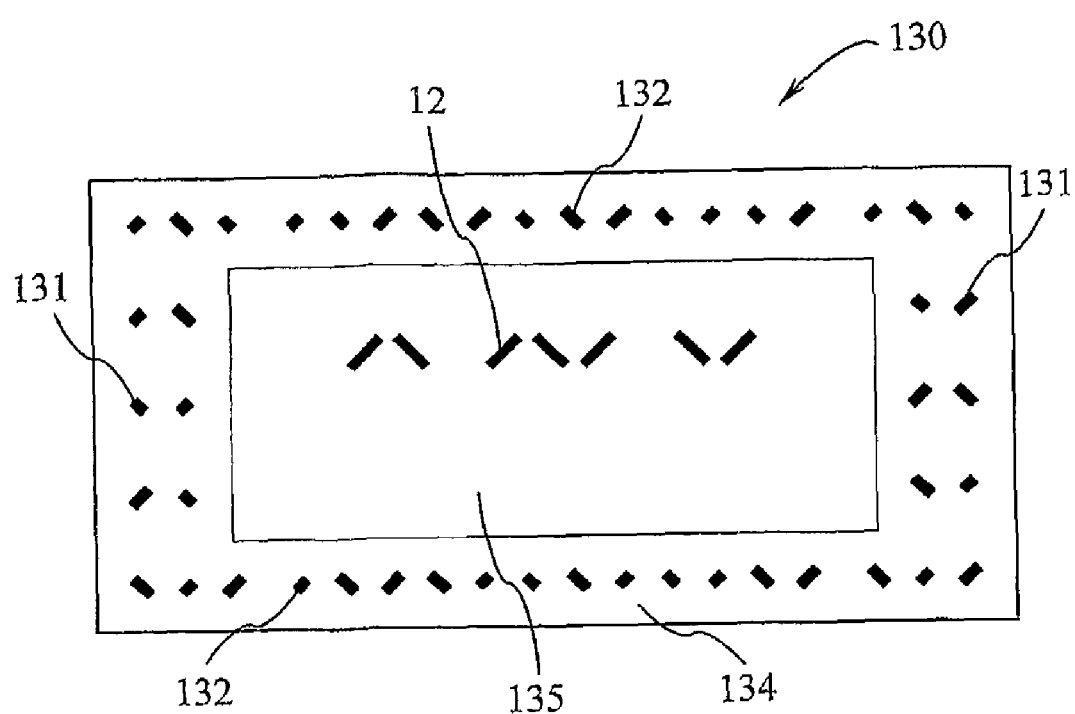
FIG. 13 is a schematic view of an exemplary RFID data tag that includes error correction elements and reference elements.

FIG. 13 illustrates a schematic view of an exemplary RPID data tag 130 that includes error correction elements 131 and reference elements 132 arranged on a substrate 133. The error correction elements 131 and reference elements 132 can be similar to the symbol elements 12 representing data carried by the tag 130. For example, the error correction elements 131 and reference elements 132 can be placed in a peripheral area 134 of the tag 130, while the symbol elements 12 can be placed in the central area 135 of the tag. It should be understood that other types of the error correction and reference elements can be used for introducing redundant information, and the invention is not limited to the example shown in FIG. 13.

Figure 14:
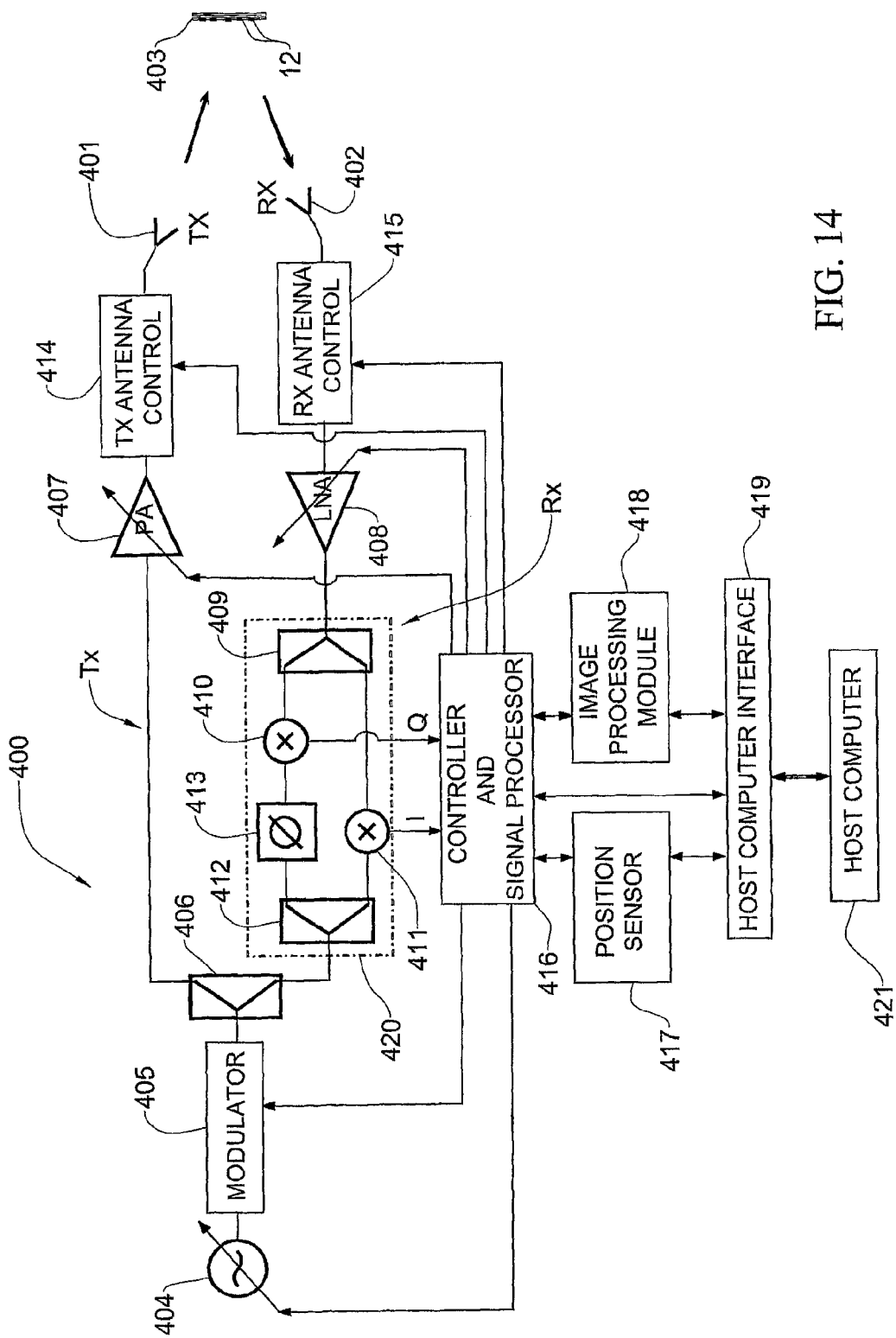
FIG. 14 is a schematic block diagram of an identification system, in accordance with an embodiment of the present invention.

Referring to FIG. 14, a schematic block diagram of the identification system (30 in FIGS. 3, 4A and 4B) for reading information stored in the data tag of the present invention is illustrated, in accordance with an embodiment of the present invention. It should be noted that the blocks in FIG. 14 are intended as functional entities only, such that the functional relationships between the entities are shown, rather than any physical connections and/or physical relationships.

The identification system 30 shown in FIG. 14 includes a transmitting antenna 401, a receiving antenna 402, and an interrogator unit 400 coupled to the transmitting and receiving antennas and to a host computer (not shown). The interrogator unit 400 includes a variable frequency generator 404, a modulator 405 coupled to the variable frequency generator 404, a first splitter 406 coupled to the modulator 405 and configured to split the signal from the modulator 405 into two equal portions applied to a transmitting part Tx and a receiving part Rx of the interrogator unit 400. The transmitting part Tx includes a power amplifier with variable gain 407 coupled to the first splitter 406 and to a transmitting (Tx) antenna control module 414 coupled to the transmitting antenna 401. The receiving part Rx of the interrogator unit 400 includes a quadrature detector 420 coupled to the first splitter 406 and a low noise amplifier with variable gain 408. The low noise amplifier with variable gain 408 is coupled to a receiving (Rx) antenna control module 415 and to the quadrature detector 420. The Rx antenna control module 415 is coupled to the receiving antenna 402.

The interrogator unit 400 further includes a controller and signal processor (CSP) 416 coupled to the variable frequency generator 404, the modulator 405, the power amplifier 407, the low noise amplifier 408, the Tx antenna control module 414, the Rx antenna control module 415, and configured for management of operation thereof. The CSP 416 is also configured for processing output signals generated by the quadrature detector 420. The CSP 416 is also coupled to a position sensor unit 417, an image processing unit 418 and to a host computer interface 419. The host computer interface 419 is coupled to a host computer 421 via a wire or wireless link. Although the image processing unit 418 is shown as a separate unit, it should be understood that when desired, the image processing unit 418 can be integrated with the controller and signal processor (CSP) 416 or with the host computer 421.

The Tx antenna control module 414 is configured for the electronic scanning control of the transmitting antenna 401. The Rx antenna control module 415 is configured for the electronic scanning control of the receiving antenna 402 synchronously with the transmitting antenna 401. Moreover, the Rx control module 415 is configured for switching polarization of the receiving antenna 402, in a case when the polarization of the electromagnetic field scattered by a tag is changed.

In operation, the variable frequency generator 404 generates a reference radio frequency signal which is modulated by the modulator 405. The modulated signal can be represented by a variety of waveforms. Examples of the waveforms include, but are not limited to, a step frequency pulsed signal comprising a set of certain frequencies $f_1, f_2, \ldots, f_n$ generated cyclically, a Linear Frequency Modulation (LFM) signal within a relatively long pulse, etc. Generally, any wideband signal covering the desired frequency band is suitable for the purpose of the invention.

Alternatively, the frequency scanning by the interrogator can be replaced by using short pulse waveforms that provide range resolution directly (see for example W. A. van Cappellen, R. V. de Jongh, and L. P. Lighthart, "Potentials of Ultra-Short-Pulse Time-Domain Scattering Measurements," published in IEEE Antennas and Propagation Magazine, V. 42, N. 4, August, 2000, PP. 35-45, the disclosure of which is incorporated hereby by reference into this description.

The modulated signal from an output terminal of the modulator 405 is fed to the first splitter 406, thereby providing the reference signal to the power amplifier 407 and to the quadrature detector 420. The reference signal is amplified by the power amplifier 407 and then is fed to the transmitting antenna 401 via the control module 414. The transmitting antenna 401 converts this signal into an open space electromagnetic field and irradiates an RFID data tag 403.

The tag 403 scatters the incident electromagnetic wave and forms a diffraction pattern (not shown) depending on the layout of the symbol elements 12.

The receiving antenna 402 intercepts a part of the electromagnetic field scattered by the tag 403 and produces an electromagnetic signal based on the intercepted electromagnetic waves. This electromagnetic signal is relayed to a low noise amplifier 408 via the control module 415. The low noise amplifier 408 gains the received signal and via the splitter 409 relays it to the quadrature detector 420.

It should be understood that gains of the amplifiers 407 and 408 may depend on RF human safety issues, power budget required by the system, signal-to-noise ratio and requirements to reduce a power consumption of the interrogator unit 400.

The quadrature detector 420 includes a second splitter 412 coupled to a phase shifter 413 in its first arm and to a RF signal mixer 411 in its second arm. The phase shifter 413 is coupled to a RF signal mixer 410. The quadrature detector 420 further includes a third splitter 409 coupled to the low noise amplifier 408 for splitting the signal received from the low noise amplifier 408. The parts of the received signal after splitting are relayed to the RF signal mixers 410 and 411.

The phase shifter 413 provides a 90° phase shift to the reference signal relayed from the first splitter 406. The proposed configuration of the RF signal mixers 410 and 411 and the phase shifter 413 is suitable for separation of a complex demodulated signal into two components: the real and imaginary parts appearing as in-phase (I) signal and quadrature (Q) signal, which are 90° out of phase with respect to each other. Signals I and Q include the information about the image of the tag 403. These signals are relayed to the CSP 416, which converts them in digital format and realizes an imaging near-field SAR or ISAR transform algorithm. In order to realize an imaging algorithm, the CSP 416 is also provided with additional data, such as a frequency range $[f_{min}, f_{max}]$ of the measurements provided by the variable frequency generator 404, as well as a range of vertical position (elevation) values $[z_{min}, z_{max}]$ and azimuth angles $[\phi_{min}, \phi_{max}]$ at which the tag 403 is observed by the interrogator unit 400 provided by the position sensor unit 417. It should be noted that the values $[z_{min}, z_{max}]$ can be either angular values (in polar coordinates) or displacement values (in cylindrical coordinates).

According to one embodiment of the invention, the position sensor unit 417 is based on known linear accelerometers and angular rate sensors, e.g., gyroscopes. Examples of the gyroscopes suitable for the purpose of the present invention include, but are not limited to, a rate gyroscope CRS-03 available from Silicon Sensing Systems Japan Ltd, MEMS angular rate sensors (gyroscopes) available from Hahn-Schickard-Gesellschaft institute for Micro Assembling Technology (HSG-IMIT), angular rate sensors (gyroscopes) available from Analog Devices, Inc.

According to another embodiment of the invention, the position sensor unit 417 includes various known built-in techniques based on optical or acoustic techniques that can provide required information about mutual position, such as a distance between the interrogator unit and the tag and their angular relation.

For example, frequency modulated continuous wave (FMCW) radar is one of the most common types of radar for precise position measurement. An advantages of such a radar is a possibility to penetrate through nonmetallic materials and monitor remotely through use of passive waveguide components. Challenging sensing applications are easily addressed with the ZX range of smart laser sensors (see, for example, News Release from Omron Electronics, "Laser sensors show their intelligence", Engineeringtalk magazine, 19 Feb. 2003, http://www.engineeringtalk.com/news/omr/omrl68.html).

Specifically, in order to ensure maximum versatility, the ZX sensor range offers a wide choice of reflective sensing heads, including models which utilize a 50 mm diameter spot for precise detection of even the smallest targets, and others with a 2 mm line beam, which allows seamless coverage to be achieved for large targets. There is also a variety of through-beam sensing heads, from narrow-beam types for precise limit detection, to 10 mm-wide curtain types for area or diameter sensing.

An acoustic method for measuring of a distance between an emitter of acoustic energy and a target object is described, for example, in U.S. Pat. No. 6,836,449, the disclosure of which is incorporated hereby by reference into this description.

It should be also noted that the position sensor unit 417 can be based on some other techniques configured for measuring displacement of objects, e.g., based on the Hall effect, variations of capacitance and/or inductance, etc.

It should be understood that in the case when the interrogator unit is a stationary device and an article having an RFID data tag is placed on a moving conveyer (as shown in FIG. 4A), information about the motion of the tags (e.g., linear velocity of the conveyer) can be delivered to the controller and signal processor 416, in order to evaluate the tag's position as a function of time.

When desired, a relative position of the interrogator and the tag can be calculated by using a triangulation method adapted for a radar technique. Such a method is based on initial information about mutual location of the interrogator and two or more additional scatterers located at a height or distance from the interrogator unit different than those of the tag 403.

In operation, the controller and signal processor 416 computes changes of the vertical position and azimuth angles at which the tag 403 is observed by the interrogator unit 400 during their mutual motion. The results calculated by the controller and signal processor 416 are relayed to the image-processing module 418, which collects this data and further performs their filtration, error correction, normalization, descrambling and conversion to a required numerical or alphanumerical format, and displays the tag's information on a display of the host computer.

When desired, the host computer 421 can be integrated with the interrogator unit 400. Alternatively, the interrogator unit 400 can be a stand alone device or a part of an RFID system, operated remotely by a local processor or via a network management. In such a case, the system can use an external host PC, such as the computers (44 in FIG. 4A, 47 in FIG. 4B) coupled to the interrogator unit via the host computer interface 419. After receiving the measured I and Q signals, the controller and signal processor 416 employs vector background subtraction and calibration to eliminate the effects of the clutter and phase shifts in the components of the transmitting and receiving chains, respectively.

Figure 15:
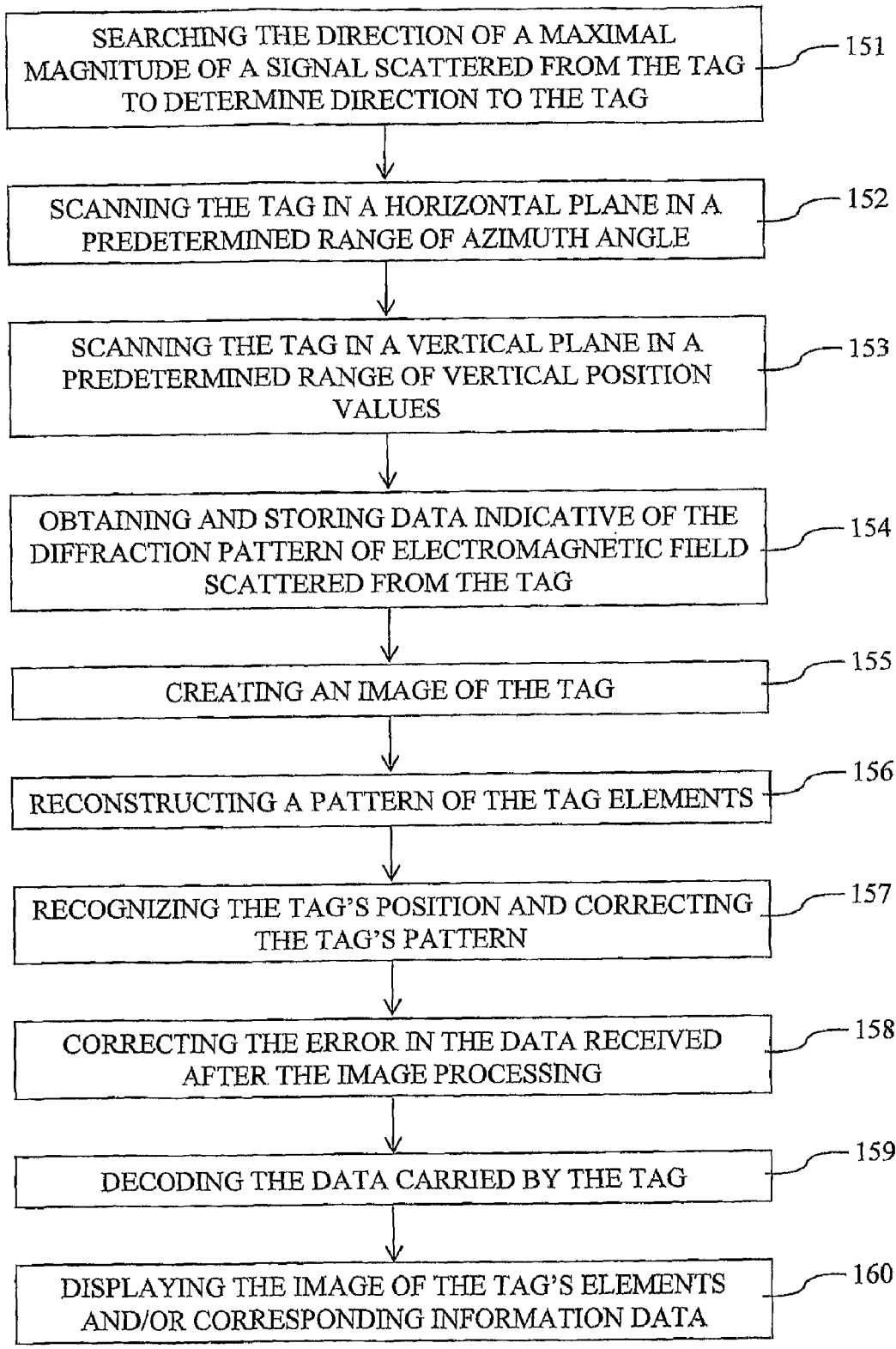
FIG. 15 shows a block-scheme diagram of a method of reading a tag by the identification system of the present invention, according to an embodiment of the present invention.

Referring to FIG. 15, a block-scheme diagram of a method of reading an RFID data tag of the present invention by the identification system of the present invention is illustrated, according to an embodiment of the present invention. In operation, the tag is irradiated by electromagnetic radiation and a reflected (scattered) signal is collected for reading the tag. The identification system employs an algorithm realizing a tag image acquisition, reconstruction and decoding.

Initially, the system searches the direction of a maximal magnitude of a re-radiated RF radiation reflected or scattered (block 151) from the tag, in order to determine direction to the tag. Thereafter, the tag is scanned (block 152) in a horizontal plane in a predetermined range of azimuth angles $[\phi_{min}, \phi_{max}]$ at which the tag is observed by the interrogator unit (400 in FIG. 14). Likewise, the tag is scanned (block 153) in a vertical plane in a predetermined range of vertical position values (elevation angles or vertical displacements) $[z_{min}, z_{max}]$. It should be understood that the scanning in the horizontal and vertical planes could be carried out when either the tag or the interrogator moves. Generally, both the tag and the interrogator can participate in a relative motion with respect to each other.

It should be understood that in high-resolution near-field imaging, that is relevant for the RFID applications, a large frequency bandwidth and wide aspect angle scanning are employed. Under such conditions range and cross-range resolutions are interrelated. For example, the frequency bandwidth can be in the range of 0 to 20 GHz, the azimuth angles can vary in the range of ±0 deg. to ±90 deg., while the vertical position angles can be in the range of ±0 deg. to ±90 deg.

The frequency scanning can be performed by a variety of waveforms, such as step frequency pulse signal, Linear Frequency Modulation (LFM) within a relatively long pulse, and/or by any other wideband signal covering the desired frequency band.

Alternatively, frequency scanning can be replaced by using short pulse waveforms that provide range resolution directly.

When desired, data indicative of the re-radiated RF radiation (diffraction pattern of electromagnetic field reflected or scattered) from the tag is obtained and stored (block 154), for example, in a database of the host computer (421 in FIG. 14). Thereafter, when the tag is moving, the measured data can be processed by a near-field ISAR algorithm to create (block 155) an image of the tag required for a further reconstructing a pattern of the tag's elements. Alternatively, in the case of the moving interrogator, a near-field SAR algorithm is used to create an image of the tag.

According to an embodiment of the present invention, the image g(r) of a moving tag at point r is computed by performing a discrete version of the near-field ISAR transform $$g(r) = \int_{z_{min}}^{z_{max}} \int_{\varphi_{min}}^{\varphi_{max}} \int_{f_{min}}^{f_{max}} G(f, \varphi, z)$$
$$\exp[jk(|r - r_t(\varphi, z)| + |r - r_r(\varphi, z)| - 2R)] \, df \, d\varphi \, dz,$$

where $G(f,\phi,z)$ denotes a matrix of the calibrated measured data (after background subtraction) versus frequency f azimuthal angle $\phi$, and vertical position values/elevation angles z. The measured data $G(f,\phi,z)$ can be represented by the amplitude and phase vector from which in-phase (I) and quadrature (Q) phase vector components can be obtained. Preferably, the data matrix $G(f,\phi,z)$ is stored in a memory of the signal processor 416. Also in Eq. (1), $k=2\pi f/c$ denotes the wave number with c being the speed of light, $r_t(\phi,z)$ and $r_r(\phi,z)$ denote the phase centers of the transmitting and receiving antennas versus azimuthal angle $\phi$, and vertical position z in the tag centered coordinate system. Furthermore, R denotes the distance from the phase centers of the antennas for $z=(z_{max}+z_{min})/2$ to the origin of the coordinate system located on the axis of rotation.

According to one embodiment of the invention, the transform in Eq. (1) can be evaluated directly by numerical quadrature, i.e., by summation of the samples of $G(f,\phi,z)$ at a set of frequencies, angles, and elevations. The meaning of Eq. (1) is summation of all measurements with phase compensation for each point in the image.

According to another embodiment of the invention, the summation is carried out by interpolation of the data to Cartesian Fourier grid, application of $FFT_5$ and performing the rectification geometrical distortion as described by D. L. Mensa in *High Resolution Radar Cross Section Imaging* (2$^{nd}$ ed.). Boston: Artech House, 1991, Appendix A, pp. 245-254, the disclosure of which is incorporated hereby by reference into this description. It should be understood that this algorithm can speed-up the calculations based on the regular numerical quadrature scheme.

According to still another embodiment of the invention, the transform in Eq. (1) can be performed by using a fast evaluation method based on a hierarchical data domain decomposition and interpolation approach as described in a paper of A. Boag, "A Fast Multilevel Domain Decomposition Algorithm for Radar Imaging," *IEEE Trans. Antennas and Propagation*, vol. 49, no. 4, pp. 666-671, April 2001, the disclosure of which is incorporated hereby into this description by reference.

Figure 16:
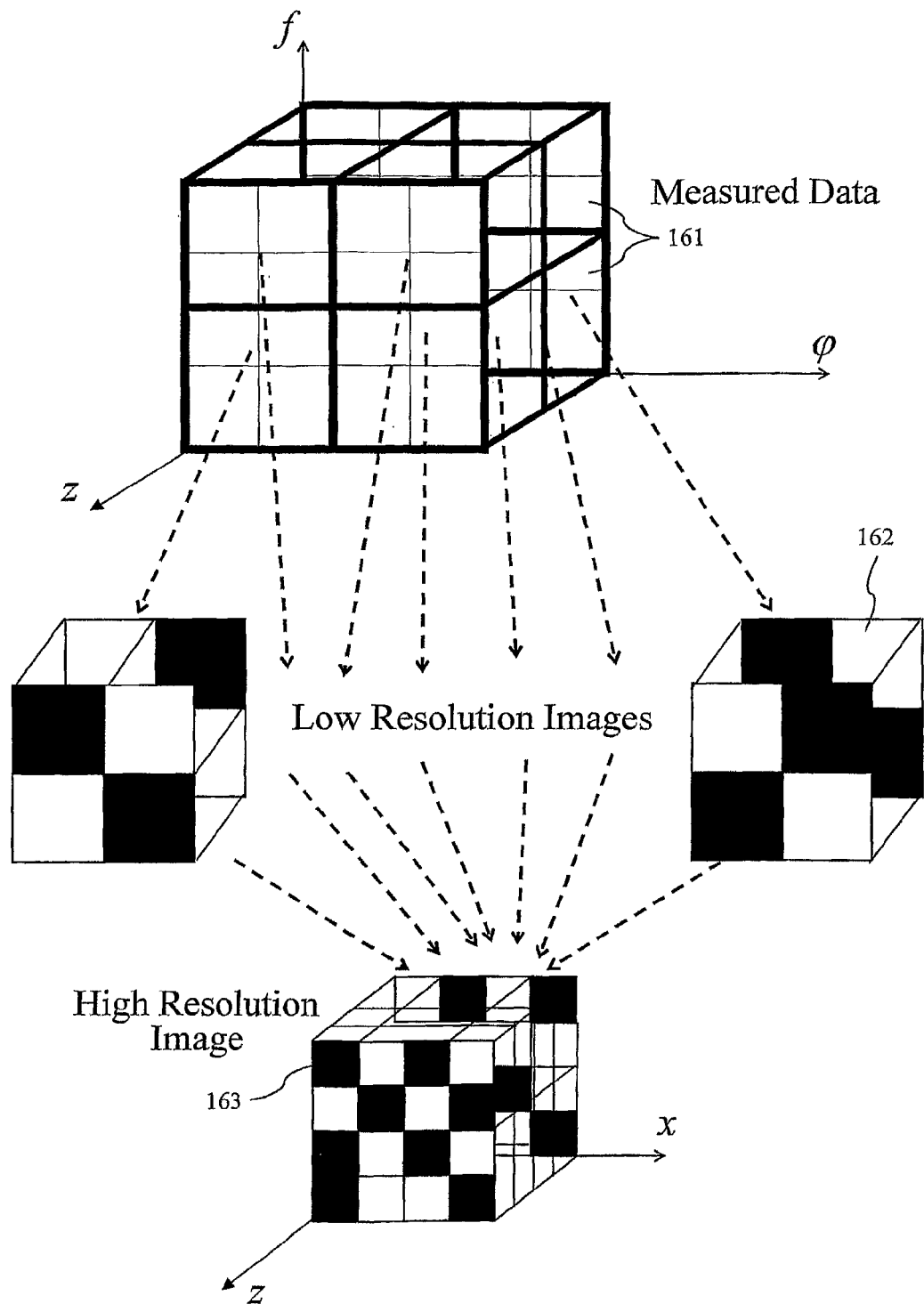
FIG. 16 shows a scheme of an implementation of the Multilevel Domain Decomposition Algorithm (MDDA) adapted for computing an image of the tag of the present invention, according to an embodiment of the present invention.

Referring to FIG. 16, a schematic illustration of implementation of the Multilevel Domain Decomposition Algorithm (MDDA) adapted for computing an image of the tag of present invention is shown, according to an embodiment of the present invention. Generally, the MDDA includes decomposing (subdividing) the data domain into a number of smaller sub-domains 161, computing their corresponding low-resolution images 162, and subsequently interpolating, correcting the phase and aggregating the results to obtain the desired high resolution image 163. It should be understood that although two-level domain decomposition is shown in FIG. 16, generally, the described approach can be extended for a multi-level domain decomposition, mutatis mutandis.

Figure 17:
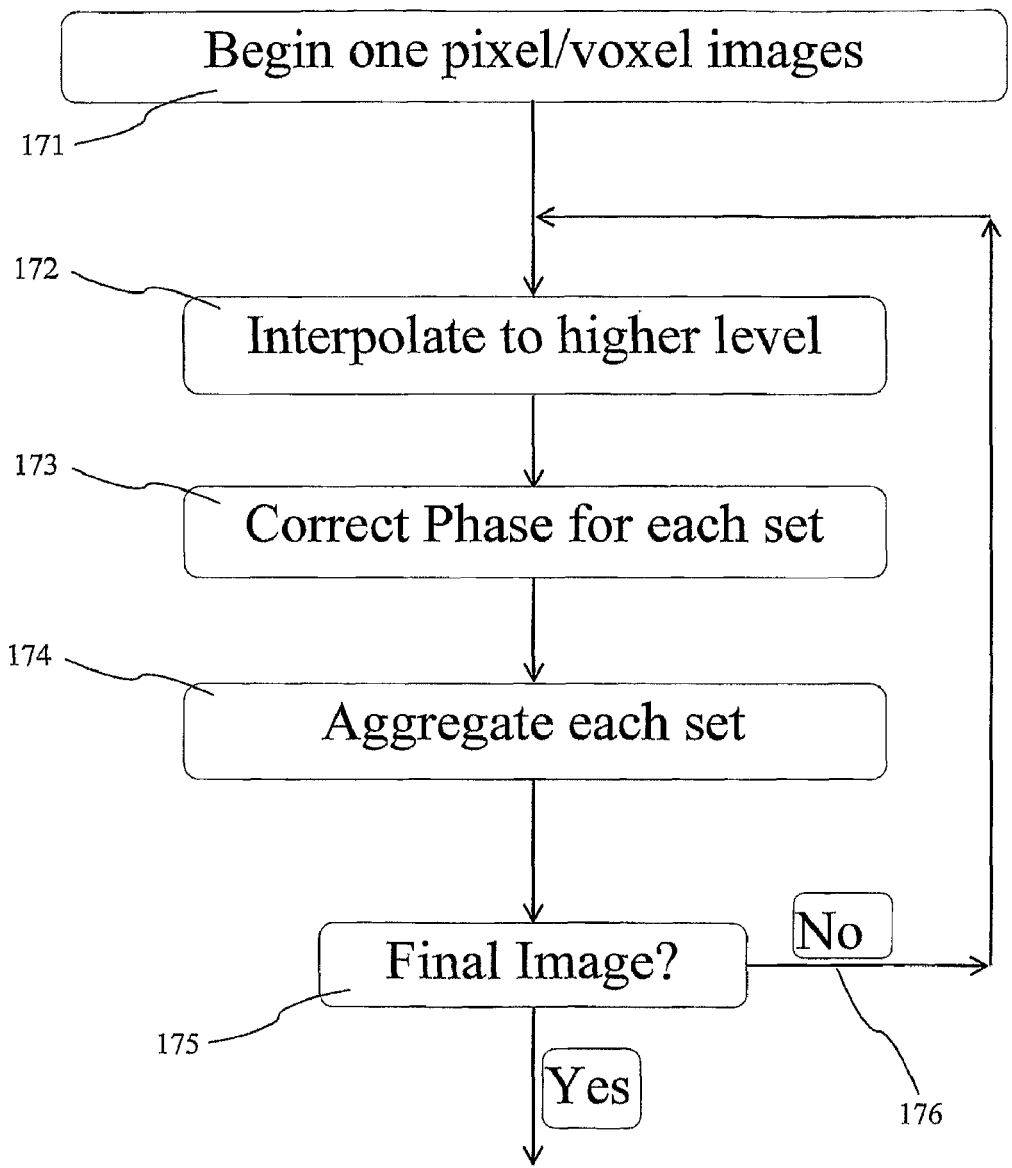
FIG. 17 shows a block-scheme diagram of the Multilevel Domain Decomposition Algorithm, according to an embodiment of the invention.

FIG. 17 shows a block-scheme diagram of the Multilevel Domain Decomposition Algorithm, according to an embodiment of the invention. Following the hierarchical data domain decomposition, very coarse, for example, one voxel images are formed from all data sub-domains at the finest level of decomposition 171. Subsequently, the low-resolution images undergo interpolation 172, phase-correction 173 and aggregation 174. In particular, in the case of the two-level decomposition shown in FIG. 16, every eight images corresponding to neighboring data domains undergo interpolation, phase-correction and aggregation. The steps of interpolating, correcting the phase and image aggregating are repeated 176 as long as a final image 175, having a desired high resolution, is formed.

When compared to the computation directly by regular numerical quadrature, computational savings in the MDDA algorithm are achieved since the low-resolution images are computed only over a coarse sampling grid and subsequently interpolated to the fine grid at a substantially lower cost. The computational savings in the MDDA algorithm are also better than in title FFT-based techniques, especially with respect to near-field imaging.

It should be noted that although the algorithm has been illustrated here for full three-dimensional (3D) images, in some cases, two-dimensional (2D) or even one-dimensional (ID) images can also be sufficient. For example, if the range to the tag has been measured as a part of some preprocessing step, one can compute only a 2D image in the cross-range plane (i.e., the plane normal to the straight line connecting the tag to the reader). If the tag comprises only one line of symbols even a ID image can be sufficient for reading all information contained in the tag.

Turning back to FIG. 15, the method of reading a tag by the identification system of the present invention further includes the step of reconstructing (block 156) the pattern of the tag's elements (i.e., symbol elements and reference elements). The reconstruction is carried out by operating the image processing unit (418 in FIG. 14) for processing the image obtained by the ISAR (or SAR) algorithm. An image processing method is configured for analysis of the SAR/ISAR image of the tag.

According to an embodiment of the invention, the image processing method begins from eliminating a background (and/or various obstacles to the radiation beam introduced together with the tag, e.g., boxes, containers, etc.) in the image of the tag and defining an area of the tag in which the symbol elements are provided. The background and/or obstacles appear in the image as certain characteristic signals having a rather weak and/or high intensity, correspondingly.

For example, the elimination of the background can be carried out by comparing the intensity data indicative of the image of the tag to a predetermined lower threshold value applied to all pixels of the image. Accordingly, the elimination of the obstacles can be carried out by comparing the intensity data indicative of the image of the tag to a predetermined upper threshold value applied to all pixels of the image. The lower and upper threshold values can be set up on the vases of preliminary experiments or empirically. Thus, the intensity data on the image which have values below than the lower threshold values or higher than the upper threshold value can be discarded from further consideration. In turn, the symbol elements can be defined in the image as local intensity maxima detected in the pattern in the intensity range between the lower and upper threshold values.

According to an embodiment of the invention, the image processing method further includes spatial filtering the image data obtained after the eliminating a background and/or obstacles, in order to reduce "noise" intensity data indicated in the image. The filtering can include such known procedures as erosion and dilation (see, for example, Serra, J., "*Image Analysis and Mathematical Morphology*", Academic Press, Inc., Orlando, Fla., USA, 1983, PP. 43-50). The detected intensity maxima in the image obtained after the filtering are then interpreted as symbol elements, according to their intensity and location in the image.

In order to keep the symbol elements detected with high level of confidence, the image processing method can further include the step of eliminating outliers and false detection symbols from the pattern, which can appear in the image, due to the numerical methods employed for processing the acquired data, namely for the SAR process. This step is carried out by employing statistical pattern recognition algorithms, which rely on both the intensity (height) of the peaks and geometrical constraints of the image pattern.

Specifically, first an orientation of the symbol row (hereinafter also referred to as a regression line) is determined by using all the local intensity maxima that were detected in the pattern. The regression line indicates the estimated orientation of the symbols on the surface of the tag. Then, the method includes sorting the local intensity maxima peaks in the regression line according to their residuals, i.e., displacement of their location in the image relative to the calculated regression line. In this case, only the peaks with relatively low residuals are chosen for further consideration of denoting symbols. The threshold of the acceptable residuals can be either set empirically, or calculated by using a cumulative distribution plot of residuals. The cumulative distribution plot defines a distribution of the frequency of appearance of the residuals with the values lower than a certain residual value. For instance, the threshold can be defined as the point where the second derivative of the residuals cumulative distribution plot is zero. The symbols are then extracted by analysis of the spatial distribution of the peaks detected in the image.

Figure 20:
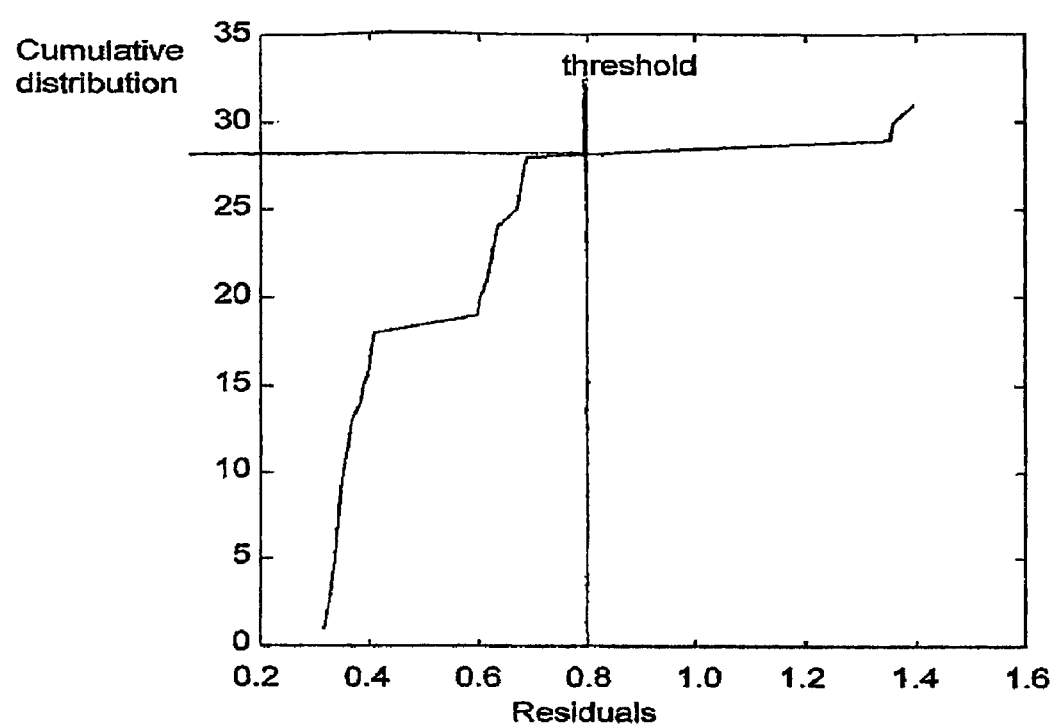
FIG. 20 illustrates an example of a cumulative distribution plot of residuals.

FIG. 20 illustrates an example of the cumulative distribution plot. For instance, setting 0.8 as the threshold for the acceptable residual, only 28 first peaks can be accepted as symbols.

It should be noted that when more than one tag is depicted in the same image, the image processing method also includes the step of identifying elements for each tag and processing patterns for each tag individually.

Figure 18:
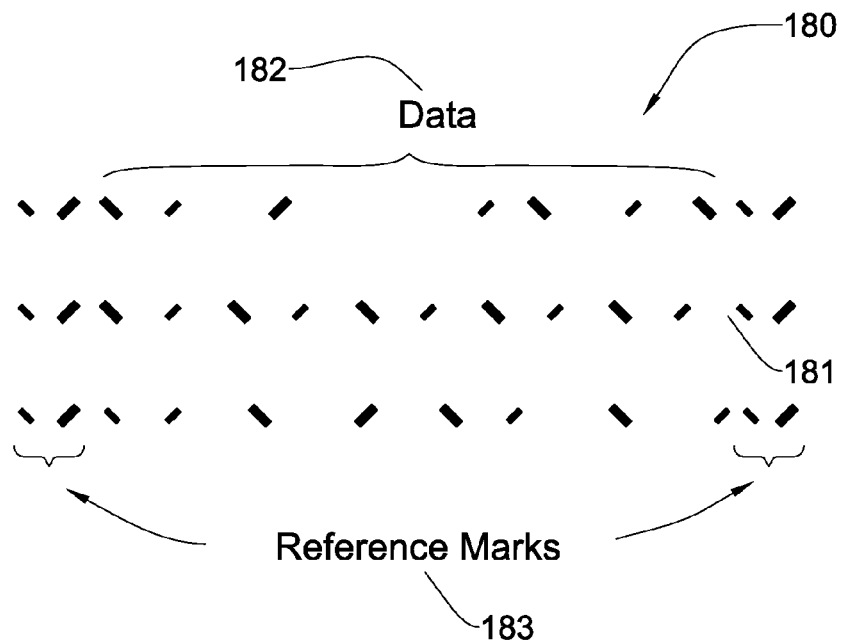
FIG. 18 shows an exemplary tag of the present invention measured by the technique of the present invention.
Figure 19:
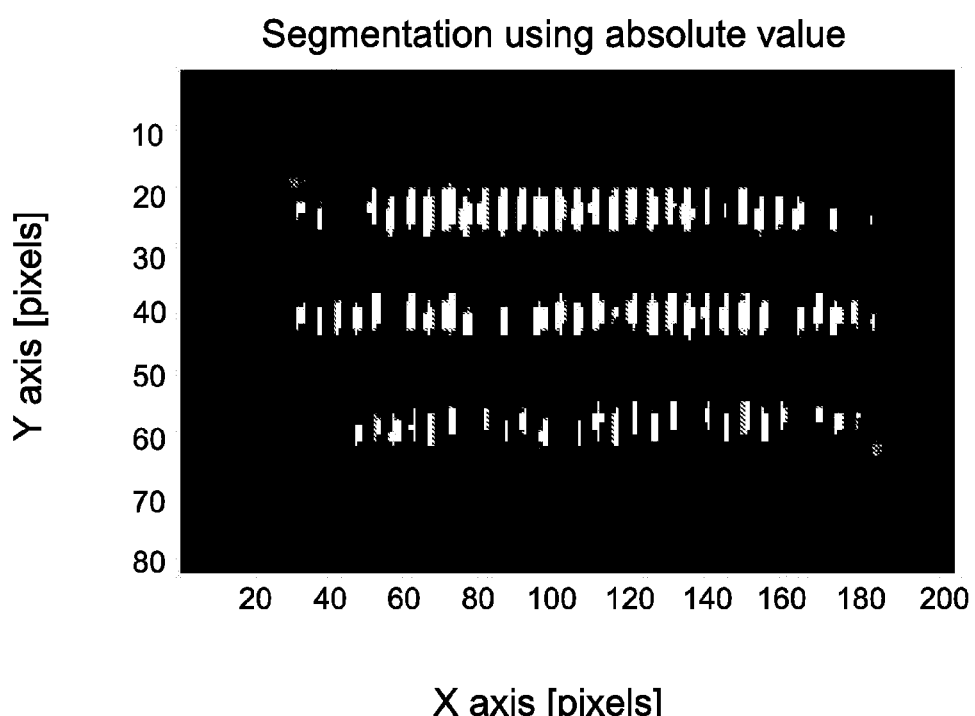
FIG. 19 shows an image of the tag shown in FIG. 18 reconstructed by the near-field ISAR algorithm shown in FIGS. 16 and 17.

FIG. 18 illustrates an exemplary tag 180 of the present invention which was used for demonstration of operation of the reading method of the present invention. The tag 180 contains three rows 181 of two types of diffractive elements, such as symbol elements (coded data) 182 and reference elements (marks) 183. The reference elements 183 are shown as two columns at the left and right borders of the tag 180. The symbol elements 182 are placed between the reference elements. An image of the tag 180 has been obtained by the near-field ISAR algorithm described above with references to FIGS. 16 and 17. A reconstructed pattern of the diffractive elements of this tag obtained after processing the image obtained by the near-field ISAR algorithm is shown in FIG. 19.

It should be understood that the pattern of symbol elements obtained by the image processing method may sometimes differ from the real pattern of symbols in the tag. This can happen due to the fact that the image of the tag provided at the step of image reconstruction may include also different artifacts, such as higher order diffraction pattern components. Moreover, the image of the elements can be distorted by inter-symbol interference or symbols coupling. Moreover, it should also be taken into account that in some cases the tag might be turned upside down (or inverted face side down).

Turning back to FIG. 15, in order to check the authenticity of the pattern received after the image processing method, the method of reading a tag by the identification system of the present invention can further include the step of recognizing the tag's position, and accordingly correcting the tag's pattern (block 157), if the tag is turned or inverted.

Likewise, the method of reading a tag can also include correcting the error in the data received after the image processing (block 158). As described above, in order to implement steps 157 and 158 for correcting the pattern, the tag should include not only the data symbol elements, but also reference elements (marks) placed for example, in peripheral regions of the tag (or as intermediate information symbols which can be included as a part of the data symbol elements) for introducing redundant information, such as parity bits, checksum, etc.

The pattern of the symbol elements is used for decoding (block 159) the data carried by the tag. According to an embodiment of the present invention, the decoding of the data includes descrambling and recovering the data stored in the tag that might be encoded in a numeric or alphanumeric format. The decoding of the tag is based on the predetermined symbol's code (language) used for encoding the data by symbol elements.

When desired, the method of reading a tag can include the step of displaying (block 160) the image of the tag's elements and/or the corresponding information data on a monitor of the host computer (421 in FIG. 14).

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

For example, the radio frequency portion of the interrogator shown in FIG. 14 might be realized by another implementation, e.g., as a super-heterodyne scheme.

Moreover, linear imaging algorithms can be employed which are based on phase compensation. These algorithms are also known as back propagation, back projection, time reversal, etc.

Likewise, inverse scattering algorithms can be employed which are characterized by non-linear processing. Although these algorithms have higher computational complexity as compared to linear imaging techniques, they provide more accurate reconstruction of the data carried by the tag than linear imaging algorithms.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims and their equivalents.

What is claimed is:

1. A radio frequency identification (RFID) data tag comprising a plurality of diffractive symbol elements being indicative of machine-readable data carried by the tag, said diffractive symbol elements having such shape that the dimension of said diffractive symbol elements along one axis being substantially different than the dimension of the elements along the perpendicular axis, each diffractive symbol element being oriented in a direction other than the direction of its neighboring elements.

2. The RFID data tag of claim 1 wherein the directions of each two neighboring elements are perpendicular to each other.

3. The RFID data tag of claim 1 wherein a data information code of the tag is defined by at least one feature selected from dimensions of the symbol elements, a layout distance from a certain element to its neighbor, and presence or absence of the element.

4. The RFID data tag of claim 1 wherein at least a part of said plurality of diffractive symbol elements introduce redundant information in a content of the tag for data error correction.

5. The RFID data tag of claim 4 wherein said redundant information is based on at least one error correction scheme selected from parity bits and checksum.

6. The RFID data tag of claim 1 wherein said diffractive symbol elements are deposited on a substrate layer.

7. The RFID data tag of claim 1 wherein said diffractive symbol elements are incorporated into the structure of an article with which the tag is associated.

8. The RFID data tag of claim 1 wherein said diffractive symbol elements are made of a material capable of absorbing, scattering or reflecting RF radiation.

9. The RFID data tag of claim 1 further comprising at least one diffractive reference element arranged for recognition of a border and orientation of the tag.

10. The RFID data tag of claim 1 further comprising a plurality of diffractive reference elements arranged between the symbol elements for distinguishing thereof.

11. A system for reading an RFID data tag comprising a plurality of diffractive elements being indicative of machine-readable data carried by the tag, said diffractive elements having such shape that the dimension of said diffractive elements along one axis being substantially different than the dimension of the elements along the perpendicular axis, each diffractive element being oriented in a direction other than the direction of its neighboring elements, the system comprising:
   a transmitting (Tx) antenna configured for emitting an RF radiation signal at a predetermined polarization towards the tag;
   a receiving (Rx) antenna configured for collecting re-radiated RF radiation produced by the tag in response to said RF radiation signal at a polarization orthogonal to the polarization of the transmitting antenna and generating electromagnetic signals indicative of the data carried by the tag; and
   an interrogator unit configured for generating the RF radiation signal transmitted towards the tag and processing said electromagnetic signals produced by the receiving antenna for determining the data carried by the tag.

12. The system of claim 11 wherein the system for reading the RFID data tag is a stationary device, whereas the tag is associated with a movable article.

13. The system of claim 11 wherein the tag is associated with a stationary article, whereas the system for reading an RFID data tag is movable.

14. The system of claim 11 wherein said interrogator unit includes:
   (i) a transmitting part (Tx) including:
      a Tx antenna control module coupled to the transmitting antenna and configured for the electronic scanning control of the transmitting antenna;
      a power amplifier with variable gain coupled to the Tx antenna control module;
   (ii) a receiving part (Rx) including:
      a Rx antenna control module coupled to the receiving antenna and configured for electronic scanning control of the receiving antenna synchronously with the transmitting antenna;
      a low noise amplifier with variable gain coupled to the Rx antenna control module;
      a quadrature detector coupled to the low noise amplifier with variable gain;
   (iii) a variable frequency generator configured for generating a reference RF signal;
   (iv) a modulator coupled to the variable frequency generator and configured for modulating said reference RF signal and producing a modulated signal;

(v) a first splitter coupled to the modulator and configured to split the signal from the modulator into two equal portions applied to the power amplifier with variable gain of the Tx part and to the quadrature detector of the Rx part, (vi) a controller and signal processor (CSP) coupled to the variable frequency generator, the modulator, the power amplifier, the low noise amplifier, the Tx antenna control module, the Rx antenna control module, and configured for management of operation thereof and for processing output signals generated by the quadrature detector;

(vii) a position sensor unit configured for providing position of the tag, (viii) an image processing unit configured for receiving signals generated by CSP, reconstructing an image of the tag and decoding data carried by the tag; and (ix) a host computer interface coupled to the image processing unit, position sensor unit and the CSP.

15. The system of claim 14 wherein said modulated signal is represented by a waveform selected from a step frequency pulsed signal and a Linear Frequency Modulation (LFM) signal.

16. A method for reading data stored in an RFID data tag comprising a plurality of diffractive elements being indicative of machine-readable data carried by the tag, said diffractive elements having such shape that the dimension of said diffractive elements along one axis being substantially different than the dimension of the elements along the perpendicular axis, each diffractive element being oriented in a direction other than the direction of its neighboring elements, the method comprising:

generating and transmitting an RF radiation signal at a predetermined polarization towards the RFID data tag;

collecting re-radiated RF radiation produced by the tag in response to the transmitted RF radiation signal at a polarization orthogonal to the polarization of said transmitted RF radiation signal; and processing said re-radiated RF radiation for determining the data carried by the tag.

17. The method of claim 16 wherein said generating and transmitting an RF radiation signal and collecting RF radiation produced by the tag is carried out while moving a reading system in a desired trajectory relative to the tag.

18. The method of claim 16 wherein said generating and transmitting an RF radiation signal and collecting re-radiated RF radiation produced by the tag is carried out while moving the tag in a desired trajectory relative to a reading system.

19. The method of claim 16 wherein said collecting re-radiated RF radiation produced by the tag includes searching the direction of a maximal magnitude of said RF radiation for determining direction to the tag.

20. The method of claim 17 wherein said processing of said re-radiated RF radiation includes:

computing an image of the tag by performing a Synthetic Aperture Radar (SAR) algorithm;

reconstructing and recognizing the pattern of the diffractive tag's elements; and decoding the data carried by the tag.

21. The method of claim 18 wherein said processing of said re-radiated RF radiation includes:

computing an image of the tag by performing an Inverse Synthetic Aperture Radar (ISAR) algorithm;

reconstructing and recognizing the pattern of the diffractive tag's elements; and decoding the data carried by the tag.

22. The method of claim 21 wherein said transmitting of the RF radiation signal and collecting of the re-radiated RF radiation produced by the tag includes scanning the tag in a predetermined frequency range $[f_{min}, f_{max}]$ in a predetermined range of azimuth angles $[\phi_{min}, \phi_{max}]$ at which the tag is observed by the interrogator unit in a horizontal plane, and in a predetermined range of vertical position values $[z_{min}, z_{max}]$ in a vertical plane, and wherein said ISAR algorithm includes performing a discrete version of the near-field ISAR transform $$g(r) = \int_{z_{min}}^{z_{max}} \int_{\varphi_{min}}^{\varphi_{max}} \int_{f_{min}}^{f_{max}} G(f, \varphi, z)$$
$$\exp[jk(|r - r_t(\varphi, z)| + |r - r_r(\varphi, z)| - 2R)] df d\varphi dz,$$

where $G(f, \phi, z)$ is the calibrated measured data after background subtraction versus frequency f, azimuthal angle $\phi$, and vertical position z; $k=2\pi f/c$ is the wave number with c being the speed of light; $r_t(\phi, z)$ and $r_r(\phi, z)$ are the phase centers of the transmitting and receiving antennas, respectively, versus azimuthal angle $\phi$, and vertical position z in the tag centered coordinate system; R is the distance from the phase centers of the antennas for $z=(z_{max}+z_{min})/2$ to the origin of the coordinate system located on the axis of rotation.

23. The method of claim 22 wherein said calculation of the near-field ISAR transform includes:

decomposing the data domain into a number of smaller sub-domains;

computing corresponding low-resolution images of the sub-domains, and interpolating, correcting the phase and aggregating the low-resolution images and repeating these steps as required to obtain a high resolution image of the tag.

24. The method of claim 16 wherein said processing of the re-radiated RF radiation includes recognizing the tag's position, and accordingly correcting the tag's pattern, if the tag is turned or inverted.

25. The method of claim 16 wherein said processing of said re-radiated RF radiation includes correcting the error in the data received after said computing of the image.

26. The method of claim 16 wherein said plurality of diffractive elements are selected from the group including diffractive symbol elements and diffractive reference elements.

27. The method of claim 20 wherein said reconstructing and recognizing the pattern of the diffractive tag's elements includes:

eliminating a background and obstacles in the image of the tag and defining an area of the tag in which the symbol elements are provided;

spatially filtering the image data obtained after the eliminating a background and/or obstacles; and eliminating outliers and false detection symbols from the image, and thereby defining the symbols in the image.

28. The method of claim 21 wherein said reconstructing and recognizing the pattern of the diffractive tag's elements includes:

eliminating a background and obstacles in the image of the tag and defining an area of the tag in which the symbol elements are provided;

spatially filtering the image data obtained after the eliminating a background and/or obstacles; and eliminating outliers and false detection symbols from the image, and thereby defining the symbols in the image.

* * * * *